US012791083B2

(12) United States Patent
Tasi

(10) Patent No.: US 12,791,083 B2
(45) Date of Patent: Nov. 10, 2026

(54) FASTENING DEVICE

(71) Applicant: Chih-Hsin Tasi, Taichung City (TW)

(72) Inventor: Chih-Hsin Tasi, Taichung City (TW)

( * ) Notice: Subject to any disclaimer, the term of this patent is extended or adjusted under 35 U.S.C. 154(b) by 49 days.

(21) Appl. No.: 18/228,121

(22) Filed: Jul. 31, 2023

(65) Prior Publication Data

US 2024/0035546 A1 Feb. 1, 2024

(30) Foreign Application Priority Data

Aug. 1, 2022 (TW) .................................. 111128829

(51) Int. Cl.
*A43C 11/16* (2006.01)
*A43C 7/00* (2006.01)
*F16G 11/12* (2006.01)

(52) U.S. Cl.
CPC .............. *F16G 11/12* (2013.01); *A43C 7/005* (2013.01)

(58) Field of Classification Search
CPC ................................. F16G 11/12; A43C 7/005
See application file for complete search history.

(56) References Cited

U.S. PATENT DOCUMENTS 2,926,406 A * 3/1960 Edwards ................ A42B 3/145 2/418
3,106,003 A * 10/1963 Herman ................. A43C 7/005 24/712.3
3,214,809 A * 11/1965 Edwards ................... A61F 9/06 2/418
3,276,090 A * 10/1966 Nigon ...................... F16L 33/08 24/274 WB
4,619,057 A * 10/1986 Sartor .................. A43B 5/0452 36/117.7
4,660,300 A * 4/1987 Morell ................... A43C 11/16 242/388.3
4,989,805 A * 2/1991 Burke .................... B65H 75/44 242/378.2
5,152,038 A * 10/1992 Schoch ................ A43C 11/165 242/400
5,249,377 A * 10/1993 Walkhoff ............... A43C 11/16 36/117.7
5,606,778 A * 3/1997 Jungkind ............. A43C 11/165 24/68 SK (Continued)

FOREIGN PATENT DOCUMENTS

CN 2396370 Y * 9/2000
CN 105680260 A * 6/2016 ............. H01R 12/77

(Continued)

*Primary Examiner* — Jason W San
*Assistant Examiner* — Anna S Rashid
(74) *Attorney, Agent, or Firm* — CKC & Partners Co., LLC

(57) ABSTRACT

A fastening device includes a case, a spool disposed in the case and configured for a lace to be wound therearound, a plurality of ratchet teeth inside the case, a ratchet element disposed at the case and located at one side of the ratchet teeth, and a knob disposed at the case. The ratchet element includes a ratchet arm selectively engaged with at least one of the ratchet teeth. As the ratchet arm is engaged with at least one of the ratchet teeth, the spool is prohibited to rotate in a releasing direction, and as the knob is rotated in a tensioning direction, the ratchet arm is disengaged from at least one of the ratchet teeth to allow the spool to tension the lace.

11 Claims, 37 Drawing Sheets

(56) References Cited

U.S. PATENT DOCUMENTS 5,669,116 A * 9/1997 Jungkind ............. A43C 11/165 24/69 SK
6,708,376 B1 * 3/2004 Landry .................. A42B 3/145 2/418
7,367,522 B2 * 5/2008 Chen ........................ A43C 7/00 242/378.1
8,231,074 B2 * 7/2012 Hu ......................... A43C 11/20 242/388.2
8,235,321 B2 * 8/2012 Chen .................... A43C 11/008 242/378.1
8,308,098 B2 * 11/2012 Chen .................... A43C 11/008 242/378.1
8,434,200 B2 * 5/2013 Chen ...................... A42B 3/145 2/418
9,072,341 B2 * 7/2015 Jungkind ............. A43C 11/165
9,101,181 B2 * 8/2015 Soderberg ............ A43C 11/165
9,339,089 B2 * 5/2016 So .......................... A44B 99/00
9,375,053 B2 * 6/2016 Burns .................... A43C 11/20
9,629,417 B2 * 4/2017 Cavanagh ............ A43C 11/165
9,635,906 B2 * 5/2017 Midorikawa ........ A43C 11/165
9,681,705 B2 * 6/2017 Trudel .................... F16G 11/12
9,706,814 B2 * 7/2017 Converse .............. A61F 5/0123
9,808,049 B2 * 11/2017 Piva ......................... A43C 7/00
10,039,345 B2 * 8/2018 Ha ..................... B65H 75/4431
10,039,348 B2 * 8/2018 Cavanagh .............. A43C 11/20
10,100,975 B2 * 10/2018 Chen ........................ B62J 15/02
10,264,852 B2 * 4/2019 Kim ..................... A43C 11/165
10,368,613 B2 * 8/2019 Ha ........................... A43C 7/00
10,499,709 B2 * 12/2019 Pollack ................ A43C 11/165
10,558,052 B2 * 2/2020 Chang .................. A43C 11/165
10,772,385 B2 * 9/2020 Jiang .................... A43C 11/165
10,842,230 B2 * 11/2020 Pollack ................... F16G 11/12
10,856,620 B2 * 12/2020 Huang ................... A43C 11/20
11,103,030 B2 * 8/2021 Bock ...................... A43C 11/20
11,109,644 B2 * 9/2021 Fiedler ............... A45C 13/1069
11,311,997 B2 * 4/2022 Petursson .............. B25G 1/002
11,344,086 B2 * 5/2022 Fiedler .................... A45F 5/004
11,492,228 B2 * 11/2022 Kruse ..................... F16G 11/12
11,524,188 B2 * 12/2022 Auston ................... F16G 11/12
11,744,329 B2 * 9/2023 Ha ....................... A43C 11/165 24/712.9
11,806,264 B2 * 11/2023 Miller ................... A61F 5/0125
11,825,911 B2 * 11/2023 Chen .................... A43C 11/165
11,859,446 B2 * 1/2024 Blackburn .............. F16G 11/14
11,919,740 B2 * 3/2024 Kruse ................ A43B 23/0205
12,104,675 B1 * 10/2024 Xiang ..................... F16G 11/12
12,116,238 B2 * 10/2024 Huang ................. A43C 11/165
12,150,525 B1 * 11/2024 Kruse .................. A43C 11/165
12,185,796 B2 * 1/2025 Hurley ............... B65H 75/4492
2003/0093882 A1 * 5/2003 Gorza .................. A43C 11/165 24/68 SK
2003/0204938 A1 * 11/2003 Hammerslag ........ A43C 11/004 24/68 SK
2007/0084956 A1 * 4/2007 Chen ........................ A43C 7/00 242/388.6
2007/0169378 A1 * 7/2007 Sodeberg ............. A45C 7/0063 36/50.5
2008/0060167 A1 * 3/2008 Hammerslag ........ A43C 11/165 24/714.6
2008/0172848 A1 * 7/2008 Chen .................... A43C 11/165 24/68 SK
2008/0196224 A1 * 8/2008 Hu ....................... A43C 11/165 24/68 SK
2010/0139057 A1 * 6/2010 Soderberg ............. A63C 10/06 242/396.2
2010/0251524 A1 * 10/2010 Chen .................... A43C 11/165 24/713.2
2010/0299959 A1 * 12/2010 Hammerslag .......... A43C 11/16 36/50.5
2011/0191992 A1 * 8/2011 Chen .................... A43C 11/008 24/713.2
2011/0303782 A1 12/2011 Hu et al.
2012/0023717 A1 * 2/2012 Chen .................... A43C 11/165 24/713.2
2013/0014359 A1 * 1/2013 Chen ...................... A42B 3/145 24/68 SK
2013/0025100 A1 * 1/2013 Ha ....................... A43C 11/165 24/712.9
2013/0092780 A1 * 4/2013 Soderberg ............ A43C 11/165 242/397
2013/0269219 A1 * 10/2013 Burns ...................... A43C 7/08 242/395
2014/0290016 A1 * 10/2014 Lovett .................. A43B 19/005 242/378.1
2014/0359981 A1 * 12/2014 Cotterman ........... A43C 11/165 24/712.9
2015/0007422 A1 * 1/2015 Cavanagh ............ A43C 11/165 29/434
2015/0059206 A1 * 3/2015 Lovett .................. A43C 11/008 12/142 R
2015/0076272 A1 * 3/2015 Trudel .................... F16G 11/12 242/381.4
2015/0191326 A1 * 7/2015 Hall ..................... A43C 11/165 242/396.4
2015/0237962 A1 * 8/2015 Soderberg .............. A43C 11/14 24/71 SK
2015/0313319 A1 * 11/2015 Ha ....................... A43C 11/165 24/712
2016/0009523 A1 * 1/2016 Omarsson .......... B65H 75/4428 242/395
2016/0058130 A1 * 3/2016 Boney ...................... A43B 3/36 24/712.6
2019/0008236 A1 * 1/2019 Ha ....................... A43C 11/165
2019/0216176 A1 * 7/2019 Converse ................. A43B 3/38
2024/0000194 A1 * 1/2024 Chen .................. B65H 75/4492
2024/0032654 A1 * 2/2024 Chen ....................... F16G 11/12
2024/0049840 A1 * 2/2024 Chen .................. B65H 75/4492

FOREIGN PATENT DOCUMENTS

CN 106919220 A * 7/2017 ......... B65H 75/4402
CN 111846339 A * 10/2020 ......... B65H 75/4457
CN 112089154 A * 12/2020 ............. A43C 11/20
DE 202016104318 U1 * 11/2016 ......... B65H 75/4452
IT 202000029228 6/2022
IT 202000029228 A1 * 6/2022
JP 2016519604 A * 7/2016 ........... A43C 11/165
KR 20220003067 A * 1/2022
TW 202206365 A * 2/2022 ............. B65H 75/48
TW 202406825 A * 2/2024 ........... A43C 11/165
WO WO-2014001918 A2 * 1/2014 ............... A42B 3/08
WO 2020223631 11/2020
WO WO-2020223631 A1 * 11/2020 ......... A43B 23/0205

* cited by examiner

1000

FASTENING DEVICE

RELATED APPLICATIONS

This application claims priority to Taiwan Application Serial Number 111128829, filed Aug. 1, 2022, which is herein incorporated by reference.

BACKGROUND

Technical Field

The present disclosure relates to a fastening device. More particularly, the present disclosure relates to a fastening device for releasing and tensioning a lace.

Description of Related Art

In daily life, cords, such as a lace or a thread, are usually used to tighten articles. The most common tightening method is to use the cord to reciprocately pass through holes on the article, such as eyelets of a shoe, and then tie a knot to secure the article. But in this kind of tightening method, the knot is loosened easily because of an external force. Not only does the knot need to be tied again, but also lots of inconveniences come owing to the insecurity of the articles.

In order to solve such problems, some practitioners developed a simple fastening mechanism including a case, a driving unit and a spring. The case includes holes configured for the lace to pass therethrough. Through the reaction force between the spring and the driving unit, the lace can be clamped between the driving unit and the case so as to be fastened. The length of the lace can be changed by pressing the spring to change the position of the driving unit. However, in such fastening mechanism, the restoring force of the spring is served as the securing force; thus, the lace is easily to be released owing to vibrations or an external force. In addition, the fastening mechanism has no space to receive the lace, and the exposure of the lace may bring danger.

Therefore, some practitioners developed another kind of buckle which may be rotated to tighten the cord, the cord may be received inside the buckle, and through the interference between components inside the buckle, and the length of the cord as well as the tightness may be adjusted. However, the structure of the buckle is complex, such that the manufacturing cost is increased, and the components inside are easily affected by external materials, which leads disabling of the structure. Therefore, not only is the using environment limited, but also the life thereof is reduced.

Based on the aforementioned problems, how to improve the structure of the fastening device to increase the durability becomes a target that those in the industry pursue.

SUMMARY

According to one embodiment of present disclosure, a fastening device includes a case, a spool disposed in the case and configured for a lace to be wound therearound, a plurality of ratchet teeth inside the case, a ratchet element disposed at the case and located at one side of the ratchet teeth, and a knob disposed at the case. The ratchet element includes a ratchet arm selectively engaged with at least one of the ratchet teeth. As the ratchet arm is engaged with at least one of the ratchet teeth, the spool is prohibited to rotate in a releasing direction, and as the knob is rotated in a tensioning direction, the ratchet arm is disengaged from at least one of the ratchet teeth to allow the spool to tension the lace.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or intervening elements may also be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
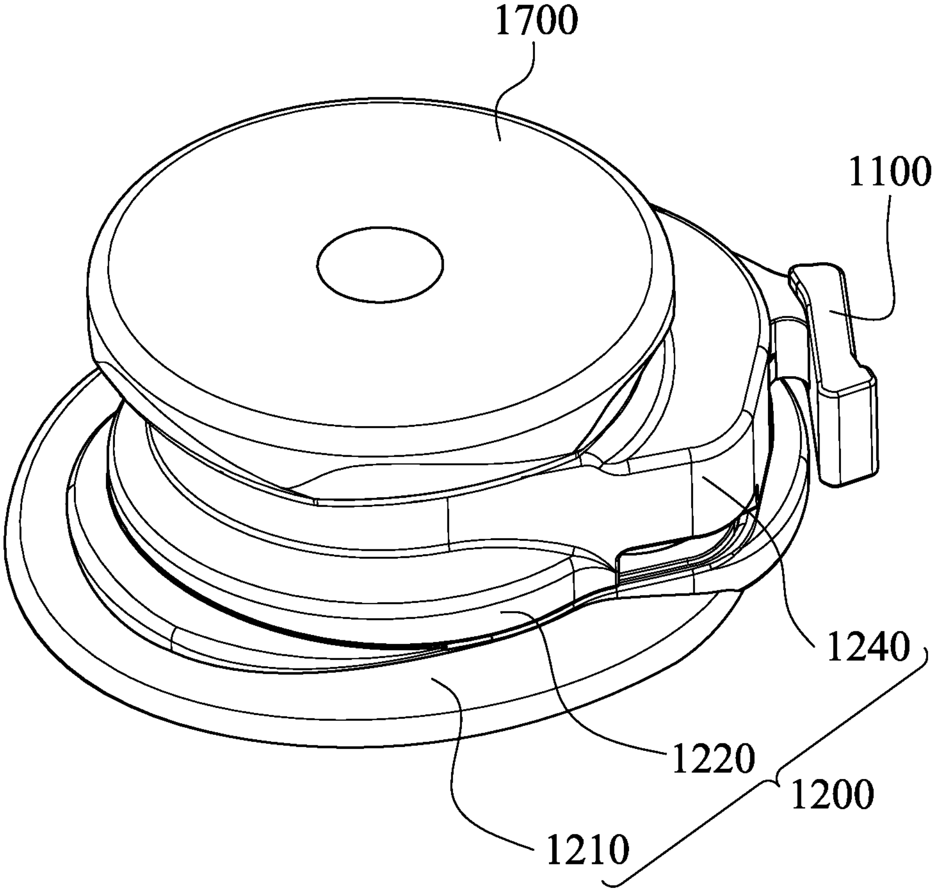
FIG. 1 is a three-dimensional schematic view showing a fastening device according to a first embodiment of the present disclosure.
Figure 2:
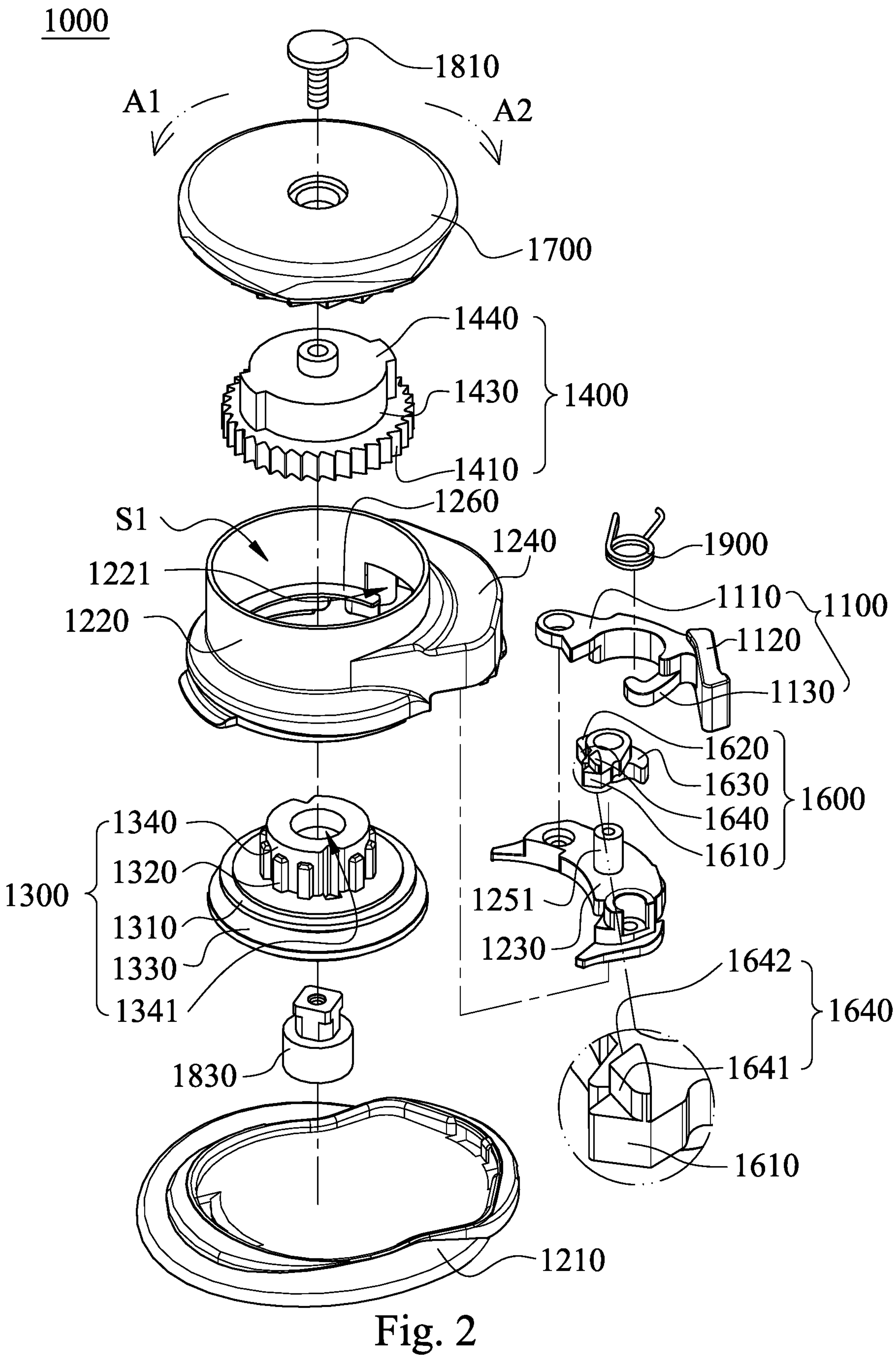
FIG. 2 is one exploded view showing the fastening device of the first embodiment of FIG. 1.
Figure 3:
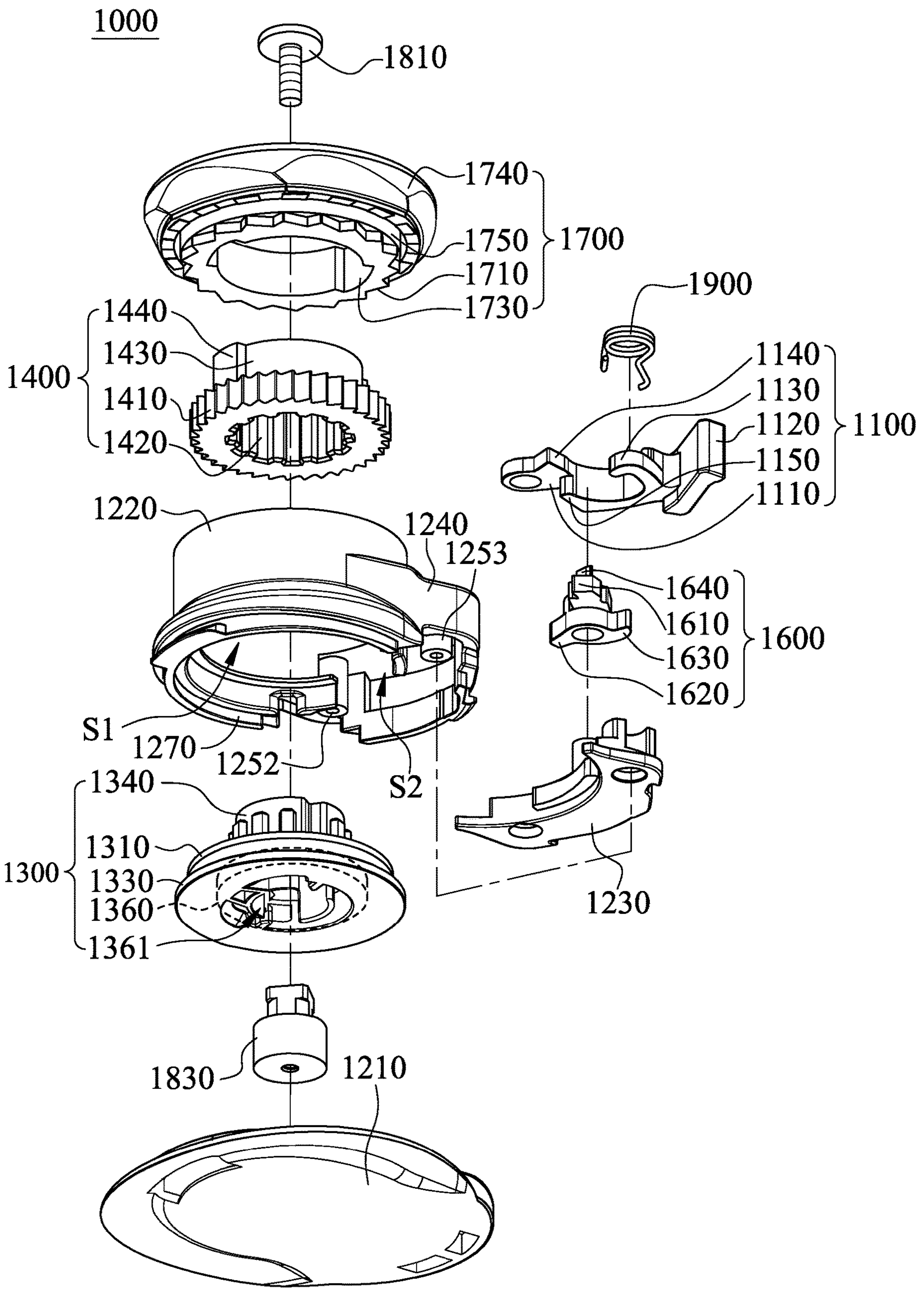
FIG. 3 is another exploded view showing the fastening device of the first embodiment of FIG. 1.

FIG. 1 is a three-dimensional schematic view showing a fastening device 1000 according to a first embodiment of the present disclosure. FIG. 2 is one exploded view showing the fastening device 1000 of the first embodiment of FIG. 1. FIG. 3 is another exploded view showing the fastening device 1000 of the first embodiment of FIG. 1. A fastening device 1000 includes a case 1200, a spool 1300 disposed in the case 1200 and configured for a lace to be wound therearound, a plurality of ratchet teeth 1410 inside the case 1200, a ratchet element 1600 disposed at the case 1200 and located at one side of the ratchet teeth 1410, and a knob 1700 disposed at the case 1200. The ratchet element 1600 includes a ratchet arm 1610 selectively engaged with at least one of the ratchet teeth 1410. As the ratchet arm 1610 is engaged with at least one of the ratchet teeth 1410, the spool 1300 is prohibited to rotate in a releasing direction A1, and as the knob 1700 is rotated in a tensioning direction A2, the ratchet arm 1610 is disengaged from at least one of the ratchet teeth 1410 to allow the spool 1300 to tension the lace.

Therefore, because the ratchet element 1600 is located at one side of the wheel 1400 and engaged with ratchet teeth 1410, operation is not easily affected by external materials such as sand or dust, and the durability of the fastening device 1000 can be increased. Details of the fastening device 1000 will be mentioned hereinafter.

As shown in FIGS. 2 and 3, the case 1200 may include a main-space S1, and a sub-space S2 located at one side of the main-space S1 and communicated with the main-space S1. The spool 1300 is in the main-space S1, the ratchet element 1600 is located in the sub-space S2, and the ratchet arm 1610 extends into the main-space S1. Precisely, the case 1200 may further include an annular wall 1220 surrounding the main-space S1, a partition 1260 protruding radially and inward from the annular wall 1220, an inner ring groove 1270 located at the annular wall 1220 and communicated with the main-space S1, and an upper opening communicated with the main-space S1. The case 1200 may further include a cover 1240 and a pivoted base 1230, the cover 1240 protrudes outward and radially from the annular wall 1220 and is connected integrally with an outer surface of the annular wall 1220, and the pivoted base 1230 connects the cover 1240 to form the sub-space S2. The annular wall 1220 may include a side opening 1221, and the side opening 1221 penetrates a body of the annular wall 1220 to allow the main-space S1 to communicate with the sub-space S2.

In the first embodiment, the fastening device 1000 may further include a swinging arm 1100 at least partially exposing from the case 1200, and as the swinging arm 1100 is operated, the ratchet arm 1610 is disengaged from at least one of the ratchet teeth 1410, thereby allowing the lace to be incrementally released. The ratchet arm 1610 and the swinging arm 1100 may be pivoted at different positions of the pivoted base 1230 and may be at least partially located at the sub-space S2. The ratchet arm 1610 may extend into the main-space S1 from the side opening 1221 to allow the ratchet arm 1610 to engage with at least one of the ratchet teeth 1410. The swinging arm 1100 at least partially exposes from the sub-space S2, i.e., the cover 1240 covering the pivoted base 1230 to hide the ratchet element 1600 while not fully hiding the swinging arm 1100, and the cover 1240 may include a hole configured for the swinging arm 1100 to extend and expose therefrom, thereby allowing a trigger portion 1120 of the swinging arm 1100 to expose from the case 1200.

The case 1200 may further include three pivoting bars 1251, 1252, 1253 and a base 1210. The pivoting bar 1251 protrudes upward from the pivoted base 1230 and is configured for the ratchet element 1600 to be pivoted thereon. The pivoting bars 1252, 1253 protrude downward from the cover 1240, the pivoting bar 1252 is configured for the swinging arm 1100 to be disposed thereon, and the base 1210 is configured for the annular wall 1220 and the pivoted base 1230 to be disposed thereon.

The ratchet element 1600 may further include a pushed portion 1620 and a linking portion 1630, the pushed portion 1620 and the ratchet arm 1610 are arranged in an interval, and the swinging arm 1100 is abutted against the linking portion 1630. To be more specific, a toothed structure of one end of the ratchet element 1600 may be defined as the ratchet arm 1610, a lever structure of the other end of the ratchet element 1600 may be defined as the pushed portion 1620, another hook structure of the ratchet element 1600 may be defined as the linking portion 1630, and the linking portion 1630 is farther away from the ratchet teeth 1410 than the ratchet arm 1610 and the pushed portion 1620. The swinging arm 1100 may further include a pivoting portion 1110, a hook portion 1130, a blocking tooth 1140 and a pushing block 1150, the trigger portion 1120 extends from the pivoting portion 1110, and the hook portion 1130 extends from the trigger portion 1120 toward the linking portion 1630 to hook the linking portion 1630. The blocking tooth 1140 is near the pivoting portion 1110 and is configured to be selectively engaged with the ratchet teeth 1410. The pushing block 1150 is configured to push the pushed portion 1620. Moreover, the fastening device 1000 may further include an elastic element 1900, and the elastic element 1900 stores an energy as the ratchet arm 1610 is disengaged from at least one of the ratchet teeth 1410. The elastic element 1900 may have a torsional spring structure, and the elastic element 1900 sleeves on the pivoting bar 1253. One end of the elastic element 1900 may be moved by the ratchet arm 1610, such that swinging of the ratchet arm 1610 may drive the elastic element 1900 to be rotated and to restore the energy. Consequently, the elastic element 1900 may push the ratchet arm 1610 and the swinging arm 1100 to return after the force exerted on the swinging arm 1100 is removed.

The fastening device 1000 may further include a wheel 1400 disposed within the main-space S1, and the ratchet teeth 1410 are located at the wheel 1400 and located within the main-space S1. The wheel 1400 may include a wheel body 1430, two ears 1440 and a plurality of first combining teeth 1420, the ratchet teeth 1410 are connected to one end of the wheel body 1430, and the two ears 1440 are disposed at the wheel body 1430 and are restricted by and rotated with the knob 1700.

The knob 1700 is substantially cover-shaped and covers on the annular wall 1220. The knob 1700 may include a covering portion 1740, a driving portion 1750, an engaging hole, two engaging grooves 1730 and a plurality of knob teeth 1710. The driving portion 1750 is integrally connected to and protrudes downward from an inter top of the covering portion 1740. The engaging hole is located at the driving portion 1750 and is configured to receive the wheel body 1430. The two engaging grooves 1730 are disposed at an inner wall of the driving portion 1750 symmetrically and are configured for the two ears 1440 to be engaged therewith, respectively, thereby rotation of the knob 1700 drives the wheel 1400 to rotate. The knob teeth 1710 are located at a lower end of the driving portion 1750 and expose from the covering portion 1740. In addition, after the wheel 1400 is disposed in the engaging hole, the ratchet teeth 1410 expose from the knob 1700 and are located below the knob teeth 1710. The knob teeth 1710 may include a first surface 1711 (labeled in FIG. 6) and a second surface 1712 (labeled in FIG. 6), a slope of the first surface 1711 is smaller than the slope of the second surface 1712, an angle is contained between the first surface 1711 and a second surface 1712, and the angle is correspondingly associated with the ratchet teeth 1410 of the wheel 1400.

Figure 4:
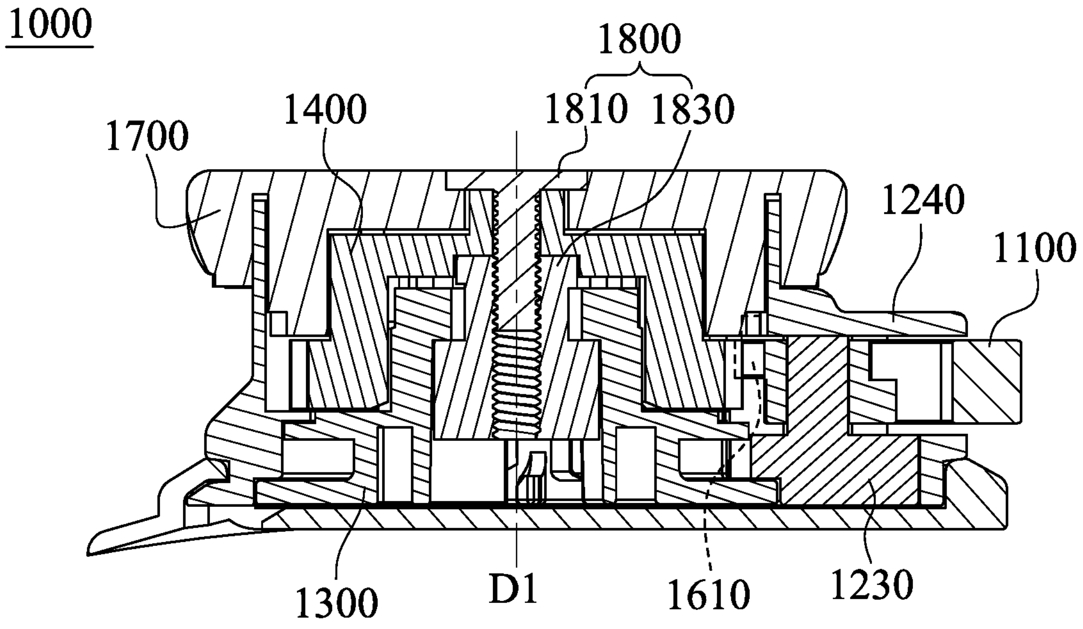
FIG. 4 is a cross-section side view showing the fastening device of the first embodiment of FIG. 1.

FIG. 4 is a cross-section side view showing the fastening device 1000 of the first embodiment of FIG. 1. Please refer to FIG. 4 with references of FIGS. 1 to 3, the fastening device 1000 may further include a connecting set 1800 penetrating the spool 1300 and coupled to the knob 1700. Precisely, the connecting set 1800 includes a central shaft 1830 and a screw bar 1810, the central shaft 1830 penetrates the spool 1300, the screw bar 1810 fastens to the central shaft 1830 downward from the knob 1700, and the central shaft 1830 is connected to the knob 1700 and the wheel 1400 and is restricted by the spool 1300.

The spool 1300 may include an upper ring portion 1310, a lower ring portion 1330, a winding shaft 1360, an upper boss 1340 and a plurality of second combining teeth 1320. The winding shaft 1360 is connected between the upper ring portion 1310 and the lower ring portion 1330, thereby forming a winding track for receiving the lace. The partition 1260 of the case 1200 may restrict the upper ring portion 1310 in an axial direction D1 to prevent the spool 1300 from leaving the main-space S1 from the upper opening. The lower ring portion 1330 is received in the inner ring groove 1270, thereby also preventing the spool 1300 from leaving the main-space S1 from the upper opening. In the first embodiment, the spool 1300 may be put into the main-space S1 from a lower opening of the case 1200. Since an inner diameter of the partition 1260 is smaller than an outer diameter of the upper ring portion 1310, the upper ring portion 1310 may be prohibited to move toward the upper opening. Moreover, because the diameter of the inner ring groove 1270 is larger than the diameter of the inner surface of the annular wall 1220, the spool 1300 may be prohibited to move upward. In other embodiments, at least one of the partition and the inner ring groove may be disposed, and the present disclosure is not limited thereto.

The winding shaft 1360 may include a central hole 1361, and the upper boss 1340 may protrude from the upper ring portion 1310 toward the knob 1700 and includes a through hole 1341 communicated with the central hole 1361. The second combining teeth 1320 are located at an outer surface of the upper boss 1340 and are configured to couple to the first combining teeth 1420. The central shaft 1830 passes the central hole 1361 into the through hole 1341 to abut against the wheel 1400, and the screw bar 1810 then fastens downward into the central shaft 1830 from the knob 1700 to connect the annular wall 1220, the spool 1300, the wheel 1400 and the knob 1700 together.

Figure 5:
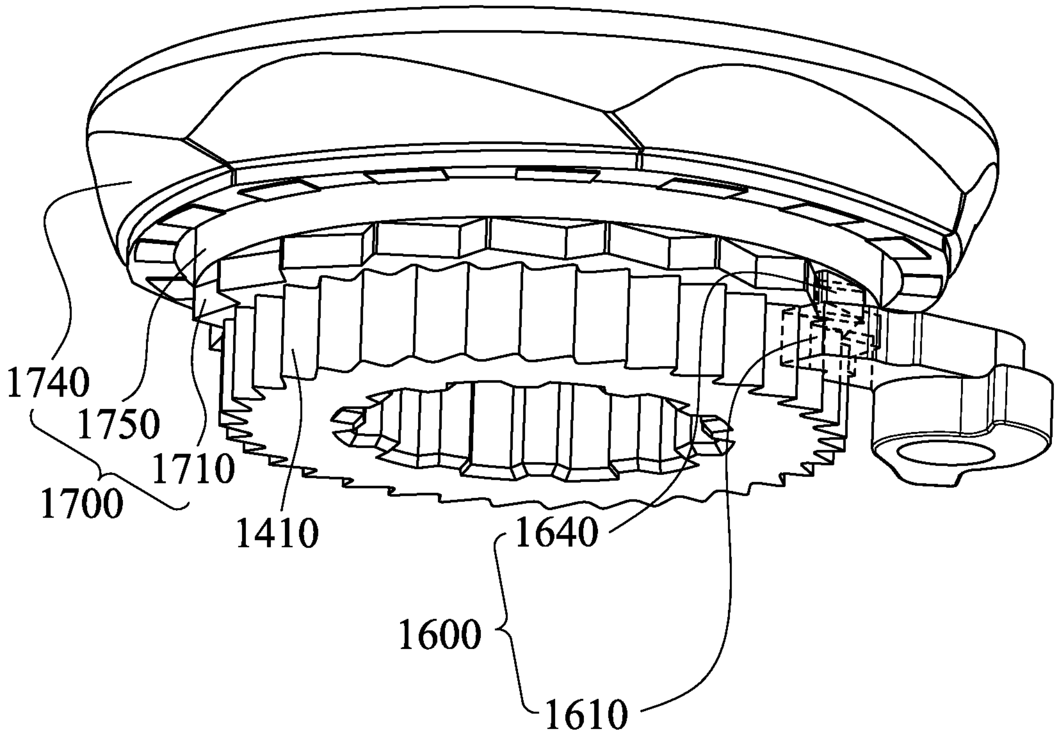
FIG. 5 is a three-dimensional schematic view showing a knob, a plurality of ratchet teeth and a ratchet element of the fastening device of the first embodiment of FIG. 1.

FIG. 5 is a three-dimensional schematic view showing a knob 1700, a plurality of ratchet teeth 1410 and a ratchet element 1600 of the fastening device 1000 of the first embodiment of FIG. 1. Please refer to FIG. 5 with references of FIGS. 2 to 3, the fastening device 1000 of the first embodiment may incrementally release the lace via rotating the knob 1700 in the releasing direction A1. As shown in FIGS. 2, 3 and 5, the ratchet element 1600 may further include a sliding portion 1640 located at the ratchet arm 1610 and corresponding to at least one of the knob teeth 1710. The sliding portion 1640 may include a first sliding surface 1641 and a second sliding surface 1642, and an angle contained between the first sliding surface 1641 and the second sliding surface 1642 is equal to the angle contained between the first surface 1711 and the second surface 1712. As the knob 1700 is rotated in the releasing direction A1, at least one of the knob teeth 1710 may push the sliding portion 1640 to rotate the ratchet element 1600, and the ratchet arm 1610 is disengaged from at least one of the ratchet teeth

1410, thereby allowing the lace to be incrementally released. The motion of the incremental release may be mentioned hereinafter.

Figure 6:
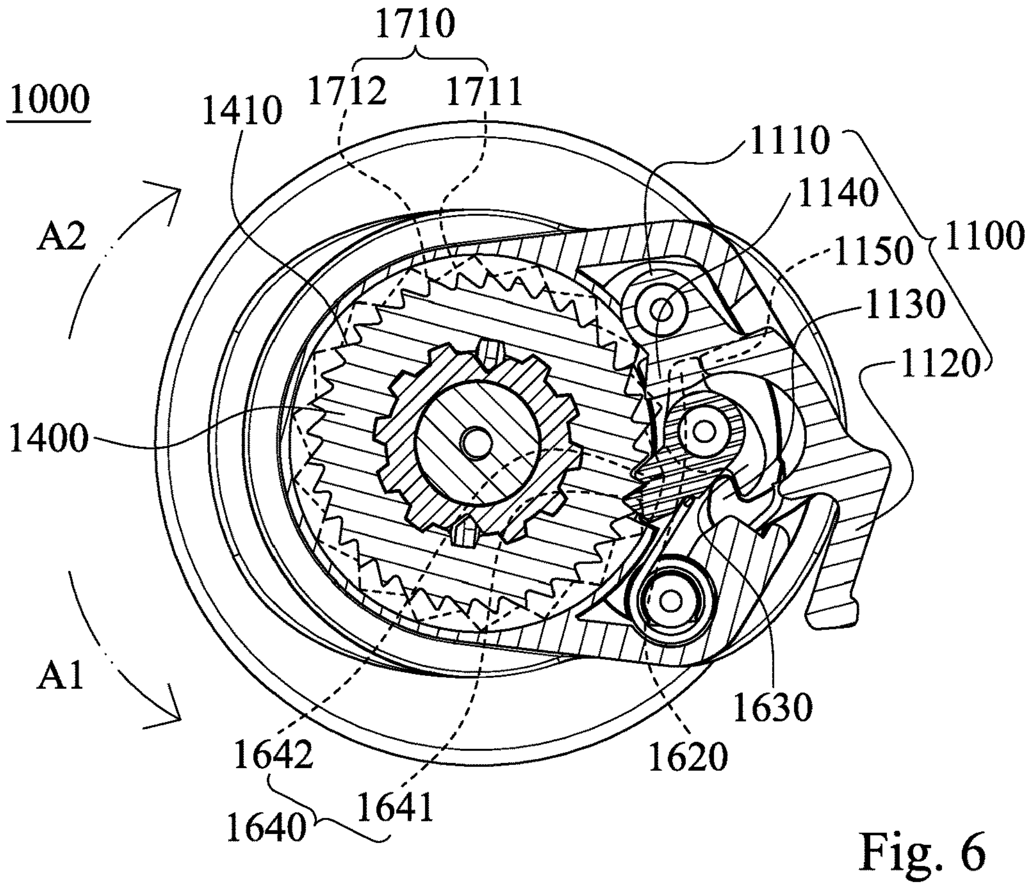
FIG. 6 is one cross-section top view showing the fastening device of the first embodiment of FIG. 1.
Figure 7:
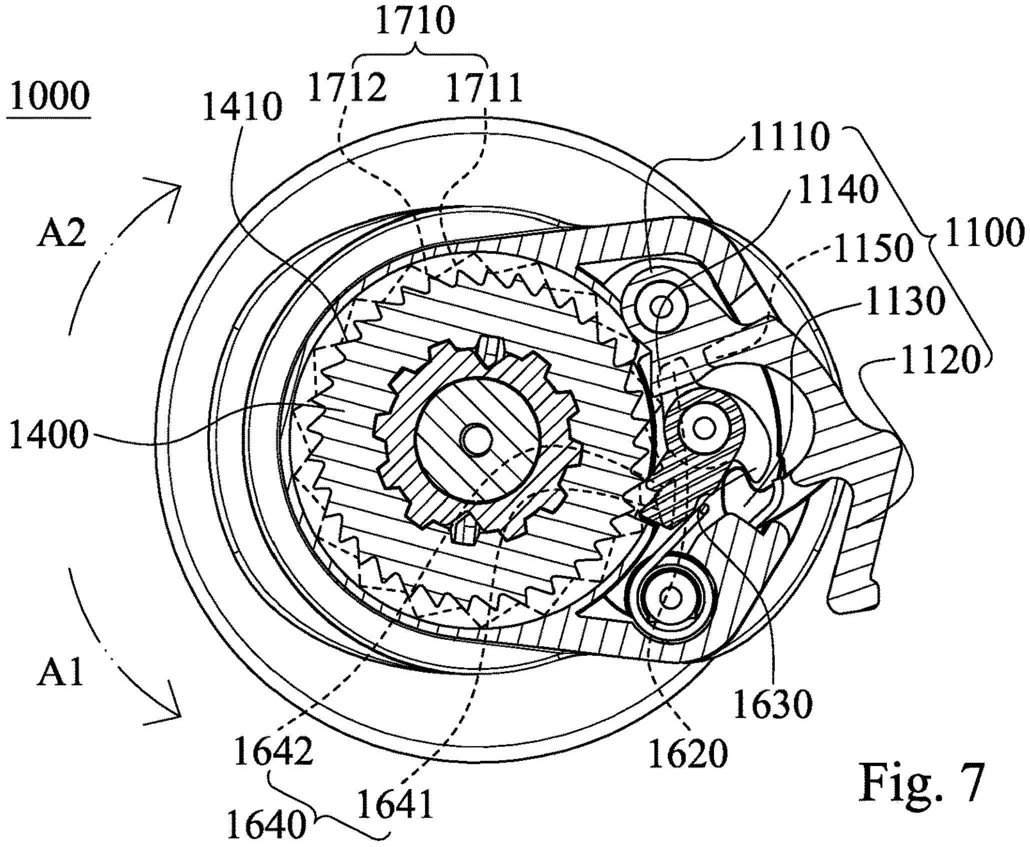
FIG. 7 is another cross-section top view showing the fastening device of the first embodiment of FIG. 1.

FIG. 6 is one cross-section top view showing the fastening device 1000 of the first embodiment of FIG. 1. FIG. 7 is another cross-section top view showing the fastening device 1000 of the first embodiment of FIG. 1. As shown in FIG. 6, if the user would like to tension the lace, the user may rotate the knob 1700 in the tensioning direction A2. The knob 1700 may rotate the wheel 1400 to allow the ratchet teeth 1410 to displace the ratchet element 1600. Consequently, the ratchet arm 1610 is disengaged from the ratchet teeth 1410, and the spool 1300 may be rotated in the tensioning direction A2 to tension the lace. As the user releases the knob 1700, the ratchet arm 1610 is engaged with the ratchet teeth 1410, and the spool 1300 is prohibited from rotating in the releasing direction A1, such that the lace cannot be released. It is noted that the second surface 1712 of the knob tooth 1710 would also push the second sliding surface 1642 of the sliding portion 1640, and the second sliding surface 1642 will slide relative to the second surface 1712 and separate from the knob tooth 1710.

On the contrary, as shown in FIG. 6, as the user would like to rotate the knob 1700 in the releasing direction A1, the first surface 1711 of one of the knob teeth 1710 that is engaged with the sliding portion 1640 pushes the first sliding surface 1641 of the sliding portion 1640, and the first sliding surface 1641 slides relative to the first surface 1711 to allow the sliding portion 1640 to separate from the one of the knob teeth 1710. Meanwhile, the ratchet element 1600 swings, the ratchet arm 1610 swings outward and separates from the ratchet teeth 1410, thereby allowing the spool 1300 to be rotated in the releasing direction A1 by the tension of the lace. Next, the sliding portion 1640 engages with a next one of the knob teeth 1710, the ratchet arm 1610 engages with the ratchet teeth 1410 again, and the spool 1300 stops rotating in the releasing direction A1, thereby one segment of the lace may be released. Hence, the goal of incremental releasing of the lace may be achieved by rotating the knob 1700.

In addition, the user may also use the swinging arm 1100 to incrementally release the lace. Precisely, as the user presses the swinging arm 1100 inward, the swinging arm 1100 pivots about the pivoting portion 1110, the pushing blocks 1150 pushes the pushed portion 1620 inward, and the ratchet element 1600 rotate to allow the ratchet arm 1610 to separate from the ratchet teeth 1410. Meanwhile, the spool 1300 is released and rotation in the releasing direction A1 is allowed, then the blocking tooth 1140 of the swinging arm 1100 will swing inward to engage with the ratchet teeth 1410, and the spool 1300 cannot keep rotating in the releasing direction A1 owing to the restriction of the blocking tooth 1140, thereby assisting stopping rotation of the spool 1300 in the releasing direction A1 before the ratchet arm 1610 returns and further facilitating for incremental release of the lace.

As fully releasing the lace, the user may operate the swinging arm 1100 to allow the hook portion 1130 to hook the linking portion 1630, and the ratchet element 1600 may be rotated to allow the ratchet arm 1610 to separate from the ratchet teeth 1410, thereby allowing the spool 1300 to be freely rotated and fully release the lace.

Figure 8:
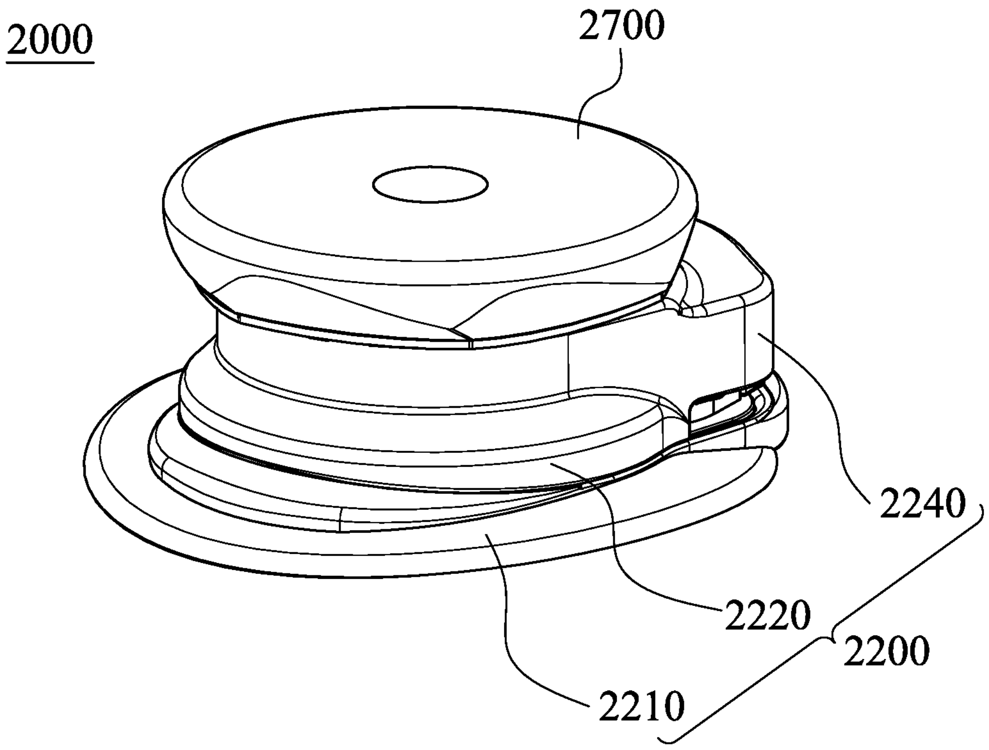
FIG. 8 is a three-dimensional schematic view showing a fastening device according to a second embodiment of the present disclosure.
Figure 9:
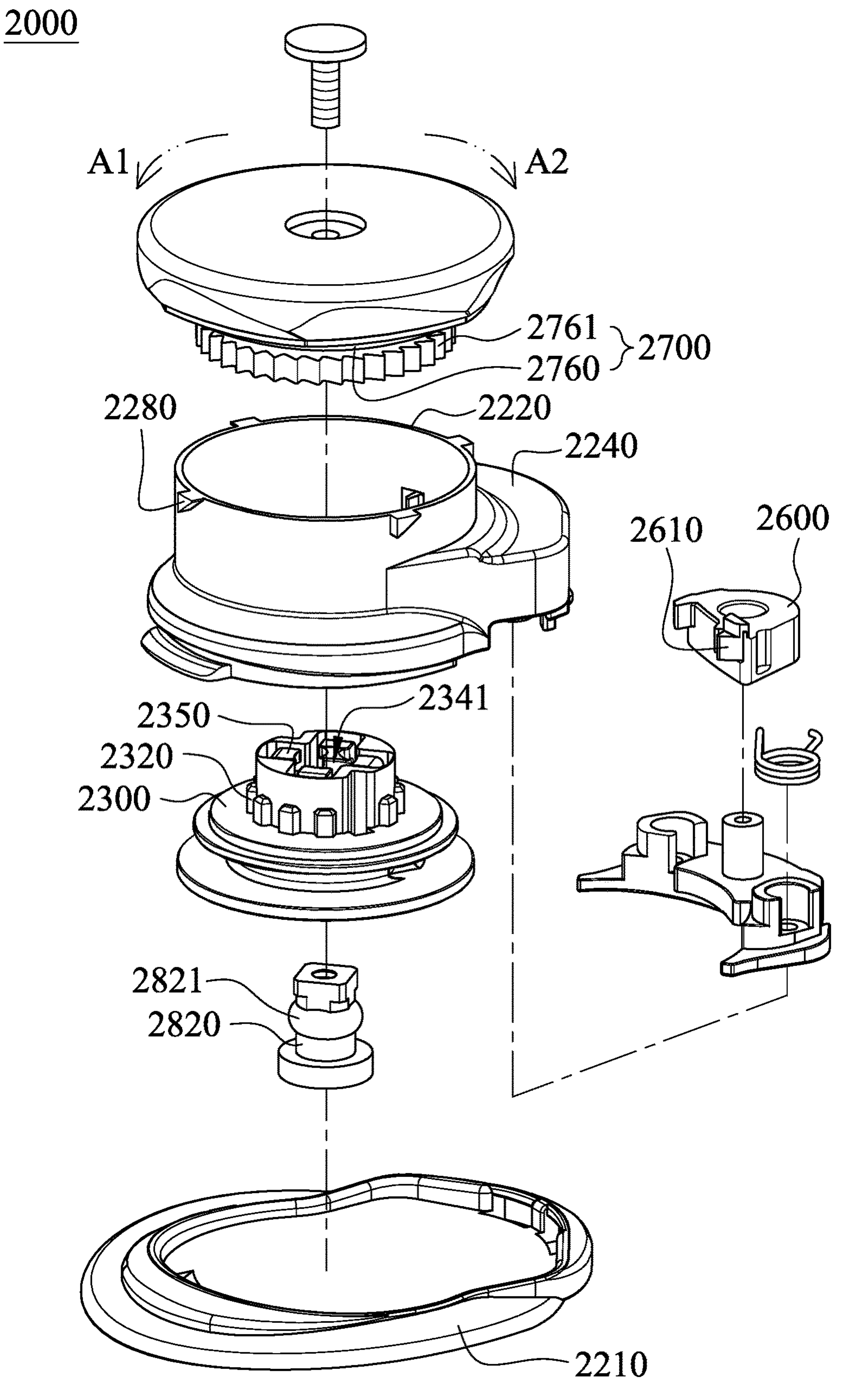
FIG. 9 is one exploded view showing the fastening device of the second embodiment of FIG. 8.
Figure 10:
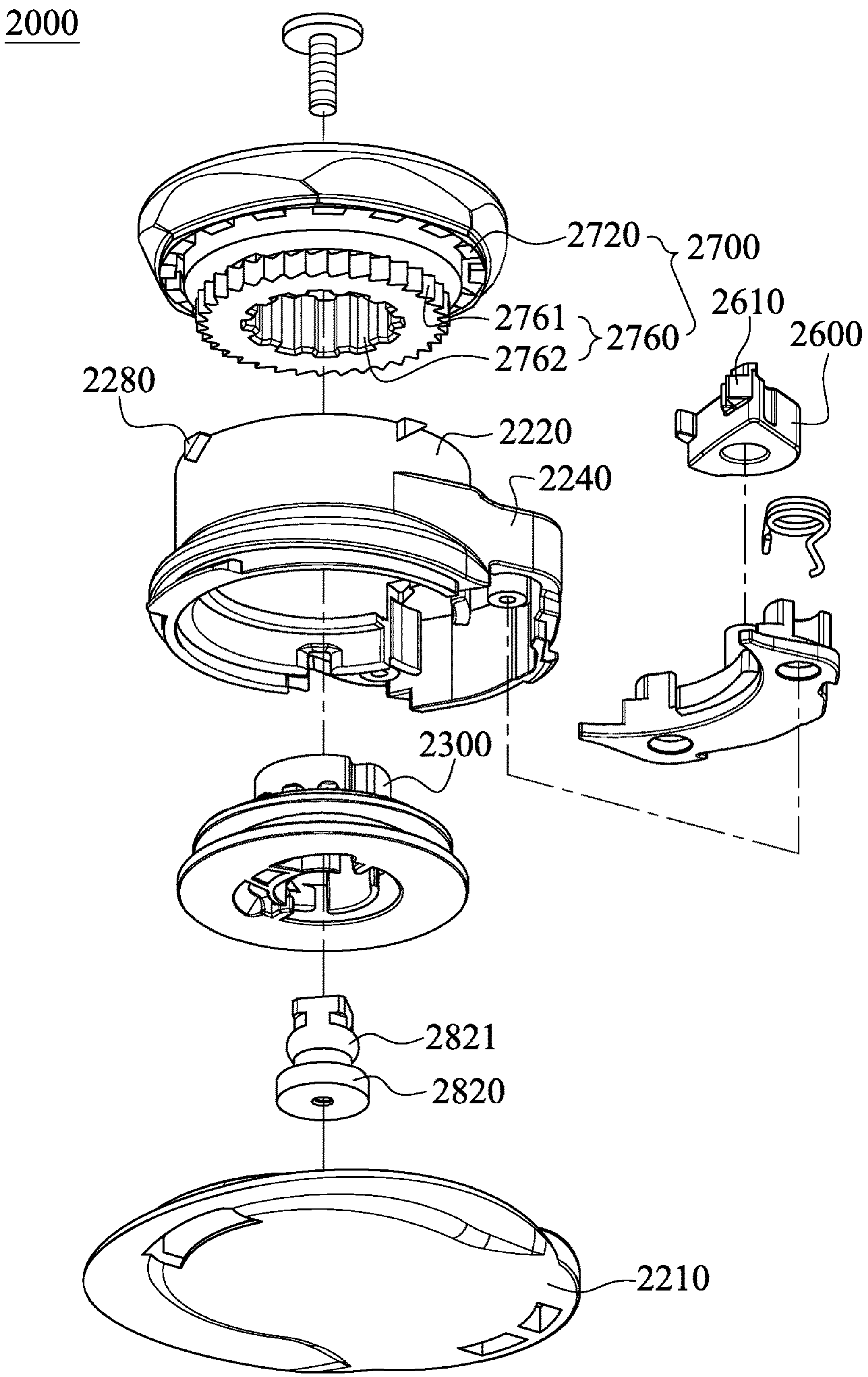
FIG. 10 is another exploded view showing the fastening device of the second embodiment of FIG. 8.

FIG. 8 is a three-dimensional schematic view showing a fastening device 2000 according to a second embodiment of the present disclosure. FIG. 9 is one exploded view showing the fastening device 2000 of the second embodiment of FIG. 8. FIG. 10 is another exploded view showing the fastening device 2000 of the second embodiment of FIG. 8. The fastening device 2000 of the second embodiment is similar to the fastening device 1000 of the first embodiment, and includes a case 2200, a spool 2300, a knob 2700 and a ratchet element 2600. The case 2200 includes an annular wall 2220, a cover 2240 and a base 2210. The details of similar structures will not be repeated. The difference is that the fastening device 2000 does not include the swinging arm 1100 and the wheel 1400 as the fastening device 1000, the cover 2240 does not include a hole as the cover 1240, the knob 2700 does not include the knob teeth 1710 as the knob 1700, and the structures of the ratchet element 2600 and the connecting set are different. Moreover, full release of the lace can be achieved by pulling the knob 2700 upward, and the fastening device 2000 does not have a function of incrementally releasing the lace.

In the second embodiment, the knob 2700 includes a covering portion and a protruding ring 2760. The protruding ring 2760 is connected to the covering portion integrally and protrudes into the main-space. A plurality of ratchet teeth 2761 are located at an outer surface of the protruding ring 2760. A plurality of first combining teeth 2762 are located in an inner surface of the protruding ring 2760. Operating the knob 2700 may move the ratchet teeth 2761 upward, thereby allowing the spool 2300 to be rotated in the releasing direction A1 for fully releasing the lace. In addition, the knob 2700 may further include a plurality of guiding teeth 2720, and the guiding teeth 2720 are disposed at an inner wall of the covering portion of the knob 2700 and face toward the outer surface of the protruding ring 2760. A gap formed between the guiding teeth 2720 and the protruding ring 2760 may be configured for the annular wall 2220 to insert therein. The case 2200 may further include a plurality of inclined guiding blocks 2280 located at the annular wall 2220, and the inclined guiding blocks 2280 may correspond to the guiding teeth 2720. Hence, as the knob 2700 is moved downward along an axial direction D1 (labeled in FIG. 11), the guiding teeth 2720 may be guided by the inclined guiding blocks 2280.

The spool 2300 may further include a positioning portion 2350, and the connecting set penetrates and is coupled to the positioning portion 2350. Pulling the knob 2700 upward allows the ratchet teeth 2761 and the connecting set to move along the axial direction D1, thereby releasing the restriction of the spool 2300, and the connecting set may be restricted by the positioned portion 2350. To be more specific, a through hole 2341 of the spool 2300 is cross-shaped and includes four end openings. The positioning portion 2350 may include four protruding arms forming a circular-opening portion. The connecting set may include a positioning shaft 2820, and the positioning shaft 2820 includes a positioning protrusion 2821. As the knob 2700 is not pulled upward and is in a first position, the positioning protrusion 2821 is located below the positioning portion 2350; as the knob 2700 is pulled upward to a second position along the axial direction D1, the positioning protrusion 2821 pushes the positioning portion 2350 to deform the four protruding arms so as to pass through the circular-opening portion, and the positioning protrusion 2821 is above the positioning portion 2350 and is restricted thereby.

Figure 11:
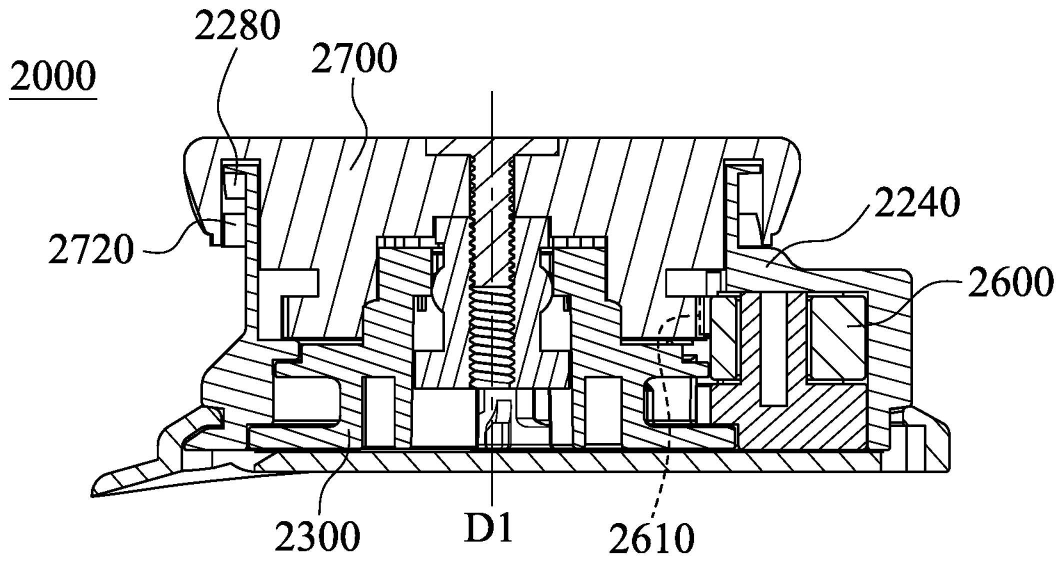
FIG. 11 is one cross-section side view showing the fastening device of the second embodiment of FIG. 8.
Figure 12:
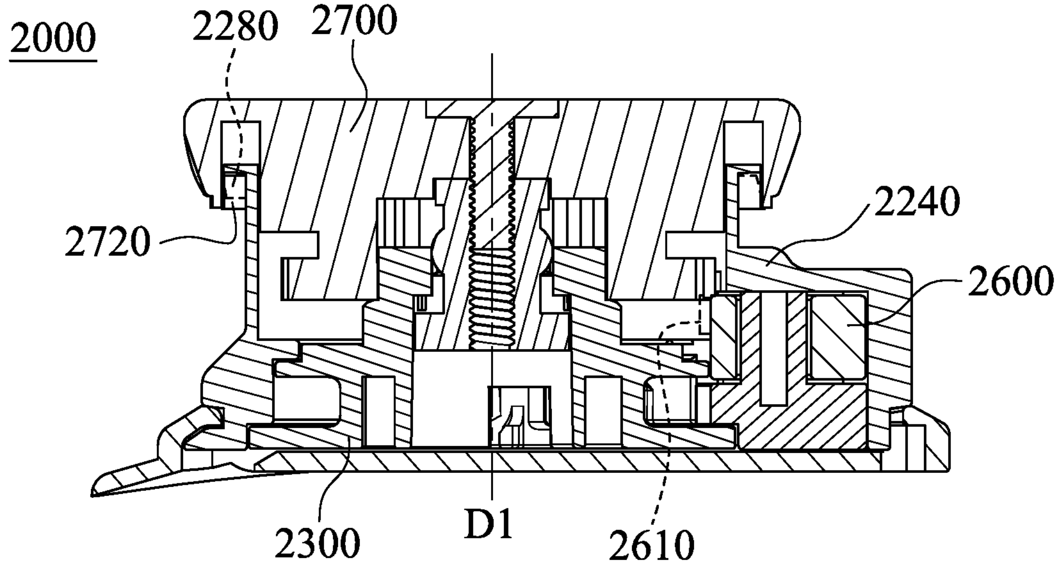
FIG. 12 is another cross-section side view showing the fastening device of the second embodiment of FIG. 8.

FIG. 11 is one cross-section side view showing the fastening device 2000 of the second embodiment of FIG. 8. FIG. 12 is another cross-section side view showing the fastening device 2000 of the second embodiment of FIG. 8. As shown in FIG. 11, as the knob 2700 is not pulled up along the axial direction D1 and is in the first position, the first combining teeth 2762 are engaged with the second combining teeth 2320. As the user would like to tension the lace, the knob 2700 may be rotated in the tensioning direction A2 to allow the ratchet teeth 2761 to displace the ratchet element 2600. Consequently, the ratchet arm 2610 is disengaged from the ratchet teeth 2761, and the spool 2300 may be rotated in the tensioning direction A2 to tension the lace. As the user releases the knob 2700, the ratchet arm 2610 is engaged with the ratchet teeth 2761, and the spool 2300 is prohibited from rotating in the releasing direction A1, such that the lace cannot be released.

On the contrary, as shown in FIG. 12, as the knob 2700 is pulled upward along the axial direction D1 by the user to switch to the second position, the first combining teeth 2762 are disengaged from the second combining teeth 2320, and the spool 2300 may be rotated freely to fully release the lace. In other embodiments, as the knob is pulled upward, the engagement between the ratchet teeth and the ratchet arm may be released while the first combining teeth are still engaged with the second combining teeth, and the present disclosure is not limited thereto.

Figure 13:
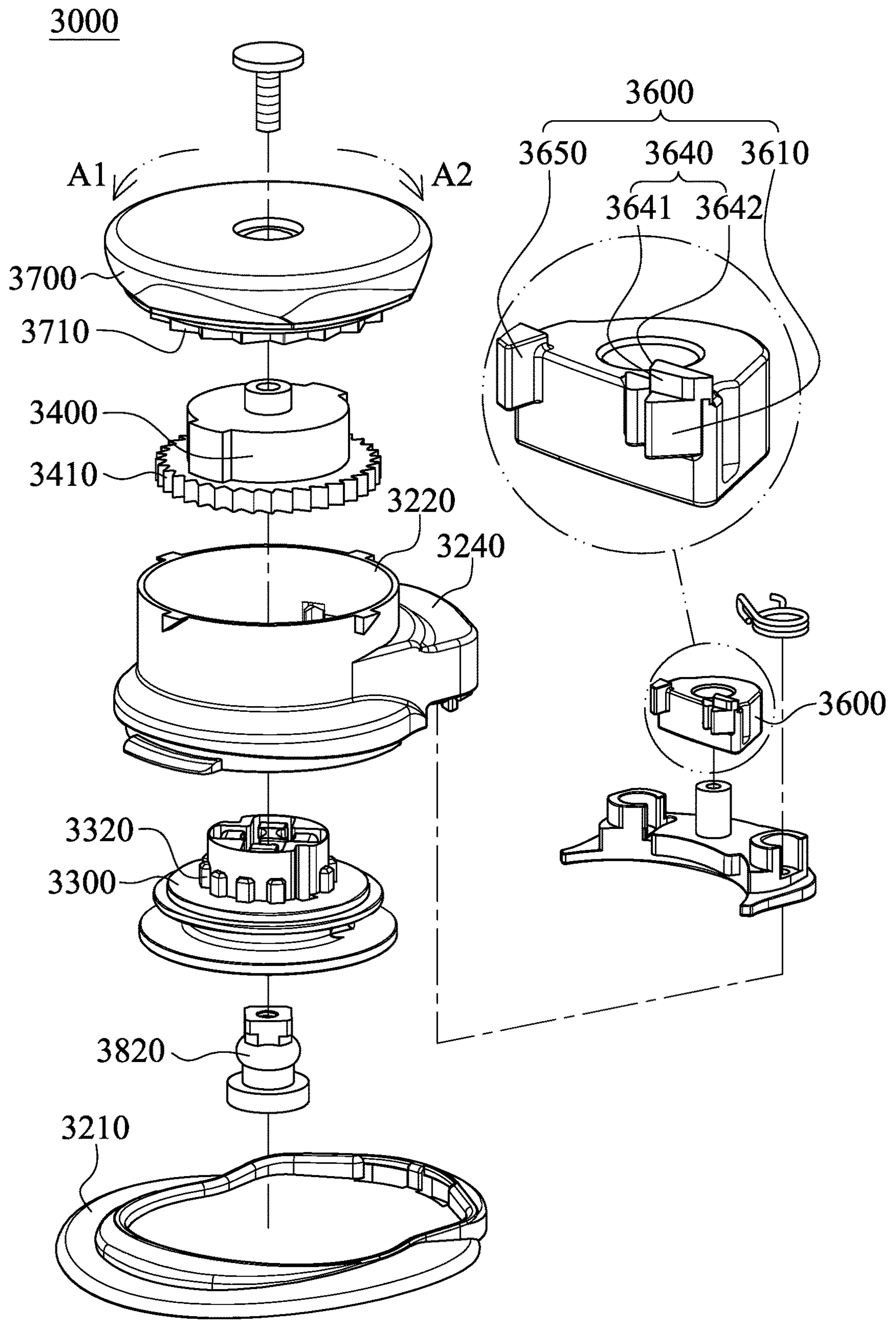
FIG. 13 is one exploded view showing a fastening device according a third embodiment of the present disclosure.
Figure 14:
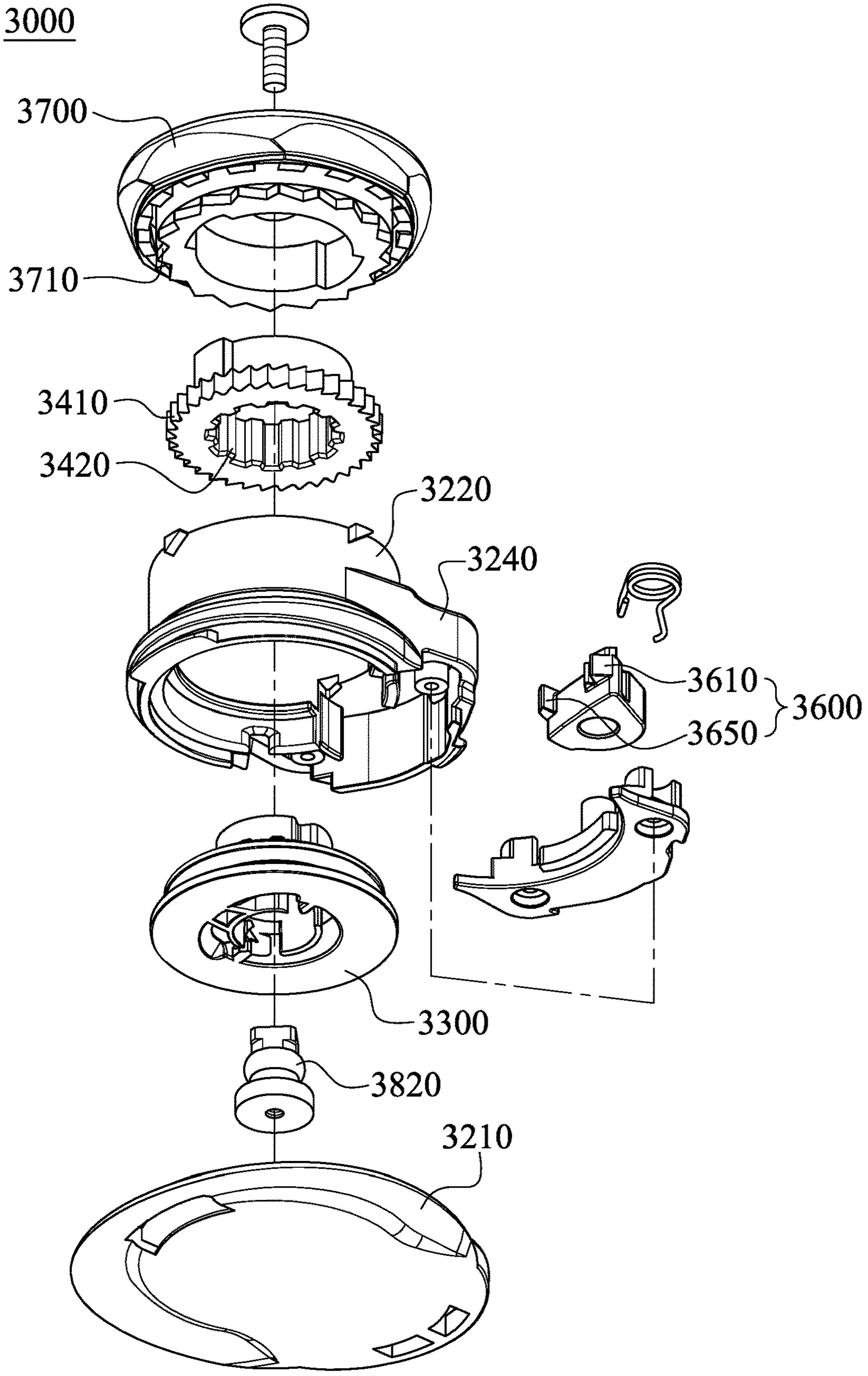
FIG. 14 is another exploded view showing the fastening device of the third embodiment of FIG. 13.

FIG. 13 is one exploded view showing a fastening device 3000 according a third embodiment of the present disclosure. FIG. 14 is another exploded view showing the fastening device 3000 of the third embodiment of FIG. 13. The fastening device 3000 of the third embodiment is similar to the fastening device 1000 of the first embodiment, and includes a case, a spool 3300, a wheel 3400, a knob 3700 and a ratchet element 3600. The case includes an annular wall 3220, a cover 3240 and a base 3210. The details of similar structures will not be repeated. The difference is that the fastening device 3000 does not include the swinging arm 1100 as the fastening device 1000, the cover 3240 does not include a hole as the cover 1240, the ratchet element 3600 further includes a stopping tooth 3650 in addition to the ratchet arm 3610 with the configuration that the stopping tooth 3650 and the ratchet arm 3610 are not engaged with the ratchet teeth 3410 at the same time. Moreover, the fastening device 3000 may include a positioning shaft 3820 whose structure is identical to the positioning shaft 2820 of the second embodiment, and pulling up of the knob 3700 may fully release the lace.

Figure 15:
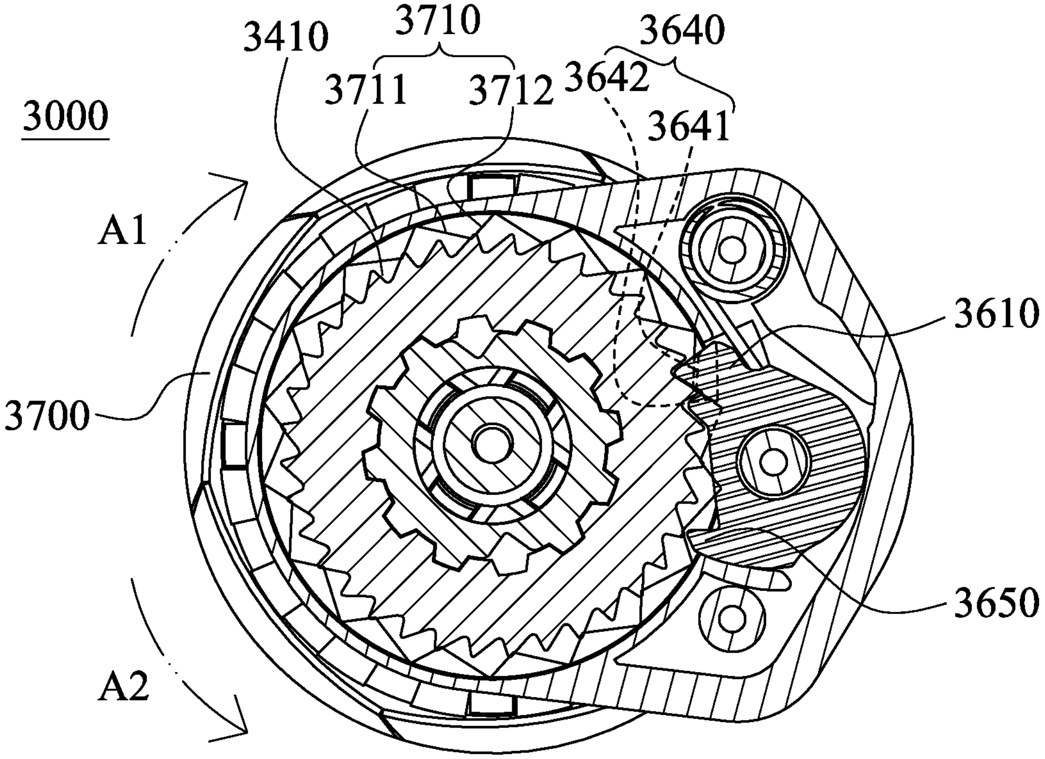
FIG. 15 is one cross-section bottom view showing the fastening device of the third embodiment of FIG. 13.
Figure 16:
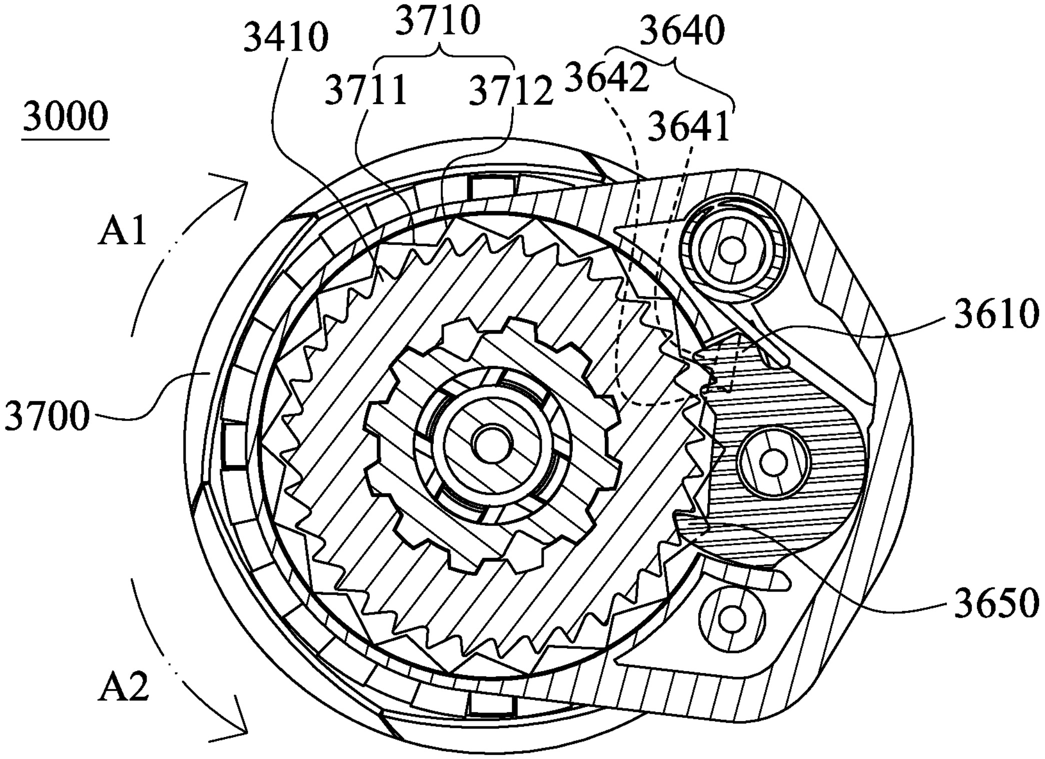
FIG. 16 is another cross-section bottom view showing the fastening device of the third embodiment of FIG. 13.
Figure 17:
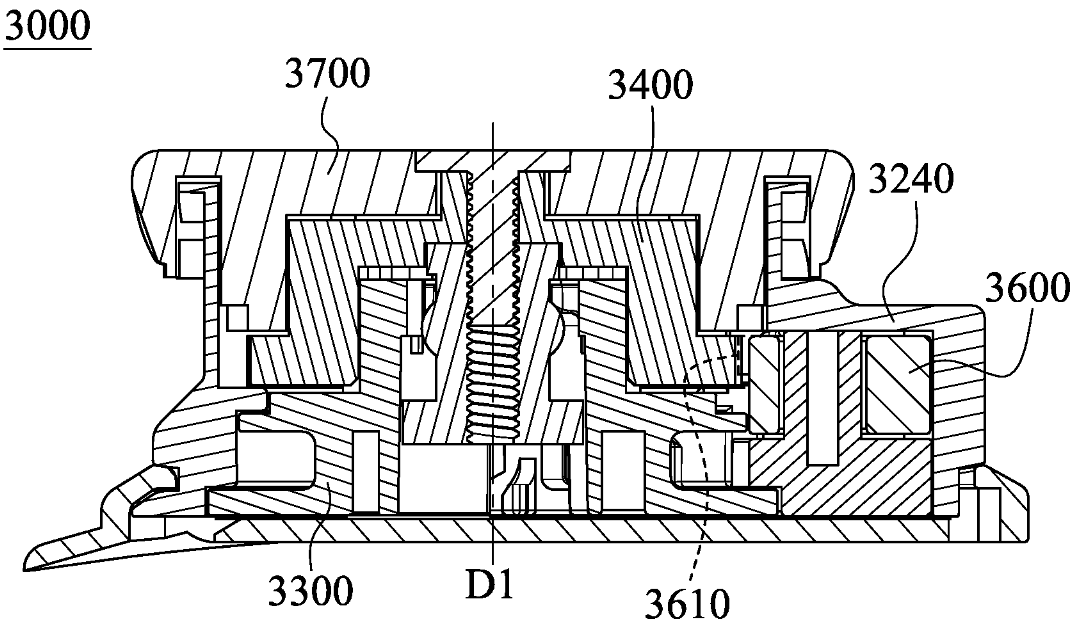
FIG. 17 is one cross-section side view showing the fastening device of the third embodiment of FIG. 13.
Figure 18:
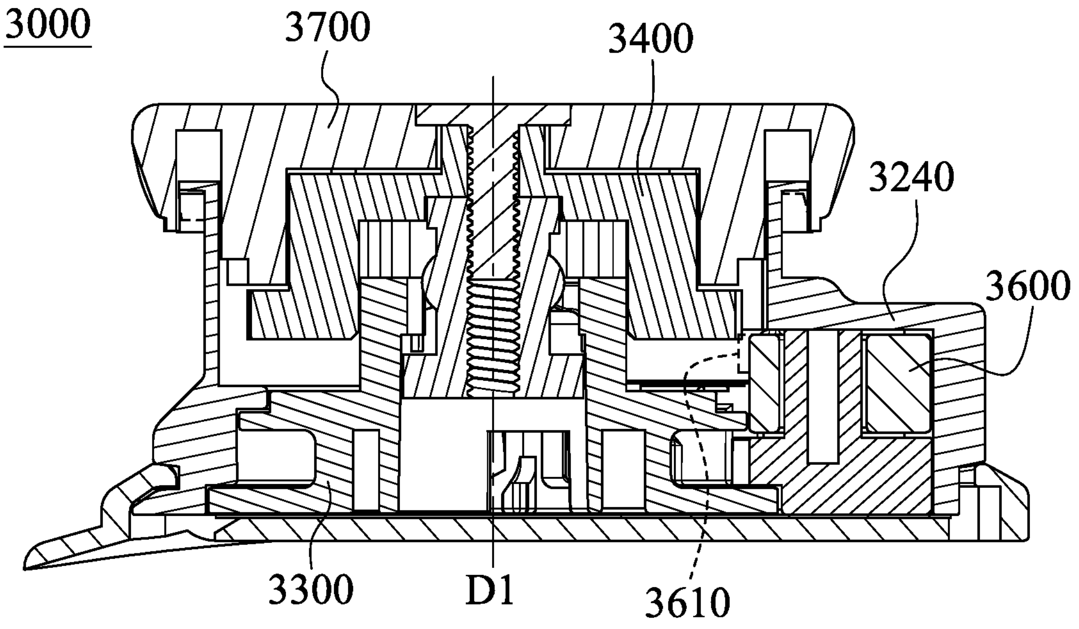
FIG. 18 is another cross-section side view showing the fastening device of the third embodiment of FIG. 13.

FIG. 15 is one cross-section bottom view showing the fastening device 3000 of the third embodiment of FIG. 13. FIG. 16 is another cross-section bottom view showing the fastening device 3000 of the third embodiment of FIG. 13. FIG. 17 is one cross-section side view showing the fastening device 3000 of the third embodiment of FIG. 13. FIG. 18 is another cross-section side view showing the fastening device 3000 of the third embodiment of FIG. 13. As shown in FIGS. 15 and 17, as the knob 3700 is not pulled up along the axial direction D1 and is in the first position, the first combining teeth 3420 are engaged with the second combining teeth 3320. As the user would like to tension the lace, the knob 3700 may be rotated in the tensioning direction A2 to rotate the wheel 3400 to allow the ratchet teeth 3410 to displace the ratchet element 3600. Consequently, the ratchet arm 3610 is disengaged from the ratchet teeth 3410, the spool 3300 may be rotated in the tensioning direction A2 to tension the lace, and relative sliding between the second surface 3712 of the knob tooth 3710 and the second sliding surface 3642 of the sliding portion 3640 will occur, which does not stop tensioning the lace. As the user releases the knob 3700, the ratchet arm 3610 is engaged with the ratchet teeth 3410, and the spool 3300 is prohibited from rotating in the releasing direction A1, such that the lace cannot be released.

On the contrary, as shown in FIG. 16, as the user would like to rotate the knob 3700 in the releasing direction A1, the first surface 3711 of one of the knob teeth 3710 that is engaged with the sliding portion 3640 pushes the first sliding surface 3641 of the sliding portion 3640, the first sliding surface 3641 slides relative to the first surface 3711 to allow the sliding portion 3640 to separate from the one of the knob teeth 3710. Meanwhile, the ratchet element 3600 swings, the ratchet arm 3610 swings outward and separates from the ratchet teeth 3410, thereby allowing the spool 3300 to be rotated in the releasing direction A1 by the tension of the lace. However, as the ratchet element 3600 swings, the stopping tooth 3650 will also swing inward to engage with the ratchet teeth 3410, and thereby continuous releasing of the lace is stopped after one segment of the lace is released. Next, the sliding portion 3640 engages with a next one of the knob teeth 3710, and the ratchet arm 3610 engages with the ratchet teeth 3410 again. Under such configuration, rotation of the knob 3700 may achieve a goal of incremental releasing of the lace.

Furthermore, as shown in FIG. 18, the knob 3700 may be pulled upward along the axial direction D1 to switch to a second position, the first combining teeth 3420 are disengaged from the second combining teeth 3320, and the spool 3300 may be freely rotated to fully release the lace.

Figure 19:
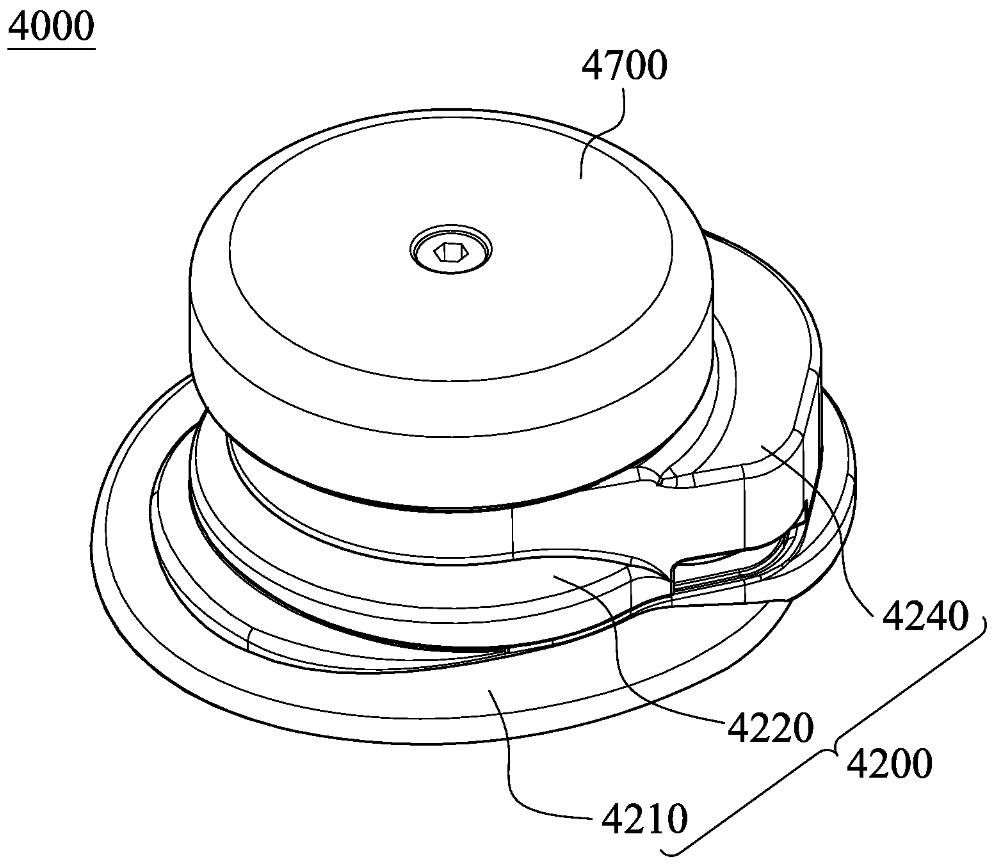
FIG. 19 is a three-dimensional schematic view showing a fastening device according to a fourth embodiment of the present disclosure.
Figure 20:
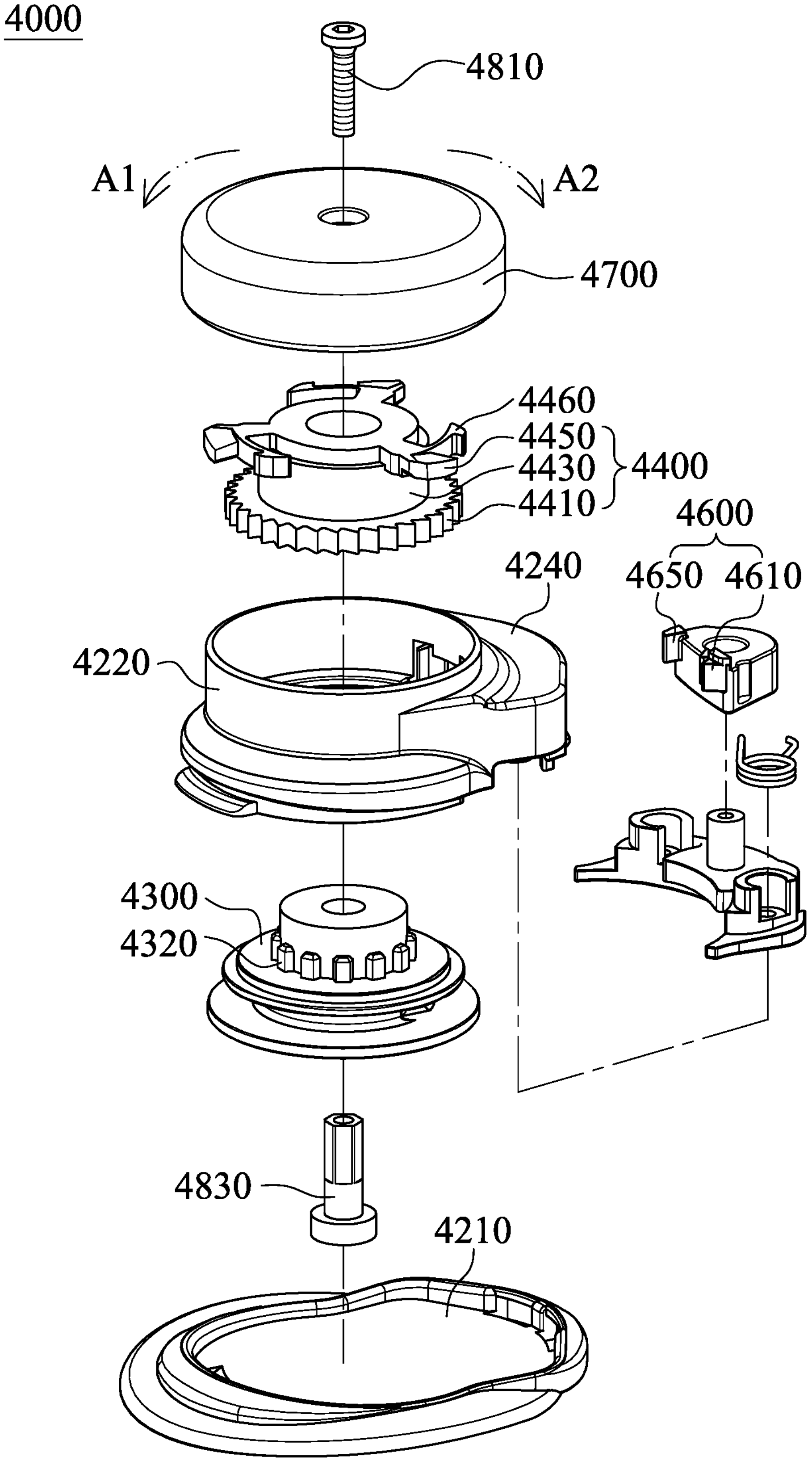
FIG. 20 is one exploded view showing the fastening device of the fourth embodiment of FIG. 19.
Figure 21:
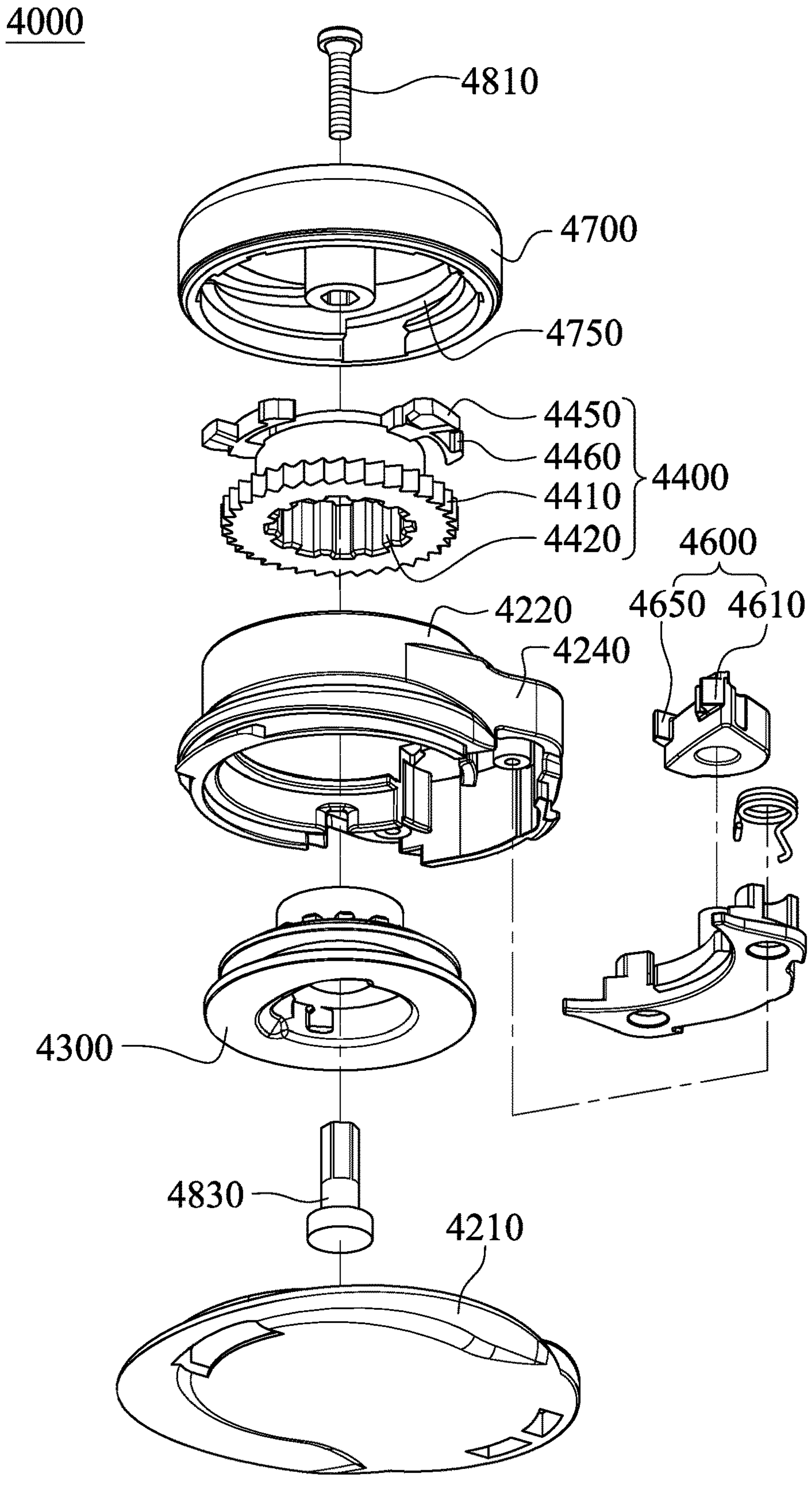
FIG. 21 is another exploded view showing the fastening device of the fourth embodiment of FIG. 19.

FIG. 19 is a three-dimensional schematic view showing a fastening device 4000 according to a fourth embodiment of the present disclosure. FIG. 20 is one exploded view showing the fastening device 4000 of the fourth embodiment of FIG. 19. FIG. 21 is another exploded view showing the fastening device 4000 of the fourth embodiment of FIG. 19. The fastening device 4000 of the fourth embodiment is similar to the fastening device 1000 of the first embodiment, and includes a case 4200, a spool 4300, a wheel 4400, a knob 4700, a ratchet element 4600 and a connecting set. The case 4200 includes an annular wall 4220, a cover 4240 and a base 4210. The details of similar structures will not be repeated. The difference is that the fastening device 4000 does not include the swinging arm 1100 as the fastening device 1000, the cover 4240 does not include a hole as the cover 1240, and the ratchet element 4600 further includes a stopping tooth 4650 in addition to the ratchet arm 4610. Moreover, the connecting set includes a screw bar 4810 and a central shaft 4830, but the structure of the central shaft 4830 is different.

The fastening device 4000 can achieve a goal of fully releasing the lace via rotating the knob 4700. Hence, the wheel 4400 may include at least one guiding portion 4450, the knob 4700 includes at least one guiding track 4750 corresponding to the at least one guiding portion 4450, and as the knob 4700 is rotated in the releasing direction A1 to allow the at least one guiding portion 4450 to be guided by the at least one guiding track 4750, the wheel 4400 is moved along an axial direction D1 (shown in FIG. 22), and the spool 4300 is rotated in the releasing direction A1 to fully release the lace.

Precisely, a number of the guiding portions 4450 is three and disposed at an upper portion of the wheel body 4430 with an interval. A number of the guiding tracks 4750 is also three and the guiding tracks 4750 are configured for receiving the three guiding portions 4450, respectively. The wheel 4400 may further include three engaging hooks 4460 each extending in a circumference direction from each guiding portion 4450, and each engaging hook 4460 is configured to couple to the knob 4700.

Figure 22:
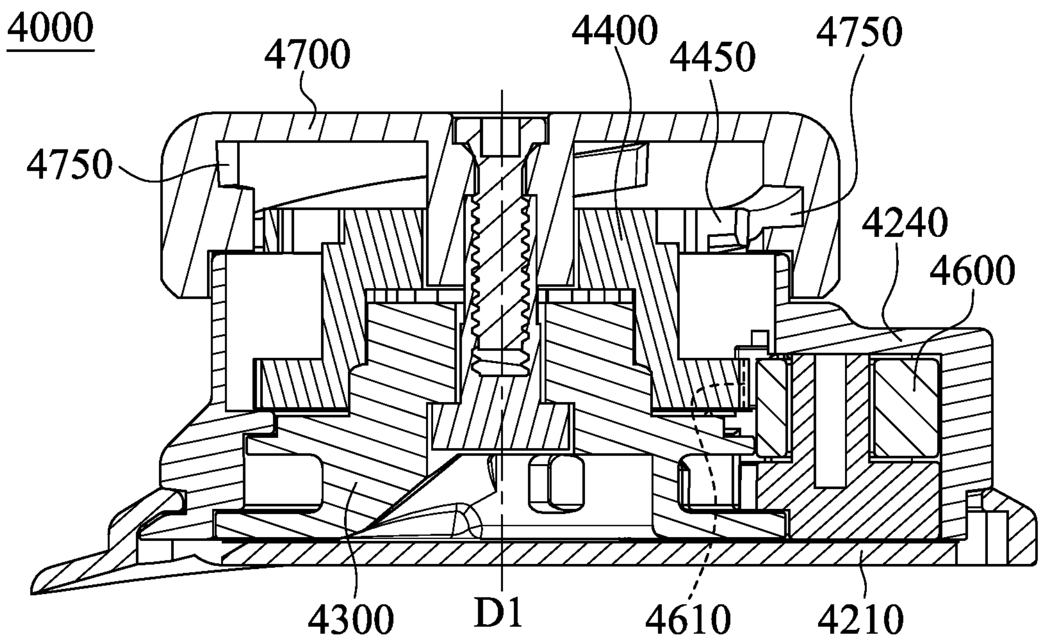
FIG. 22 is one cross-section side view showing the fastening device of the fourth embodiment of FIG. 19.

FIG. 22 is one cross-section side view showing the fastening device 4000 of the fourth embodiment of FIG. 19.

Figure 23:
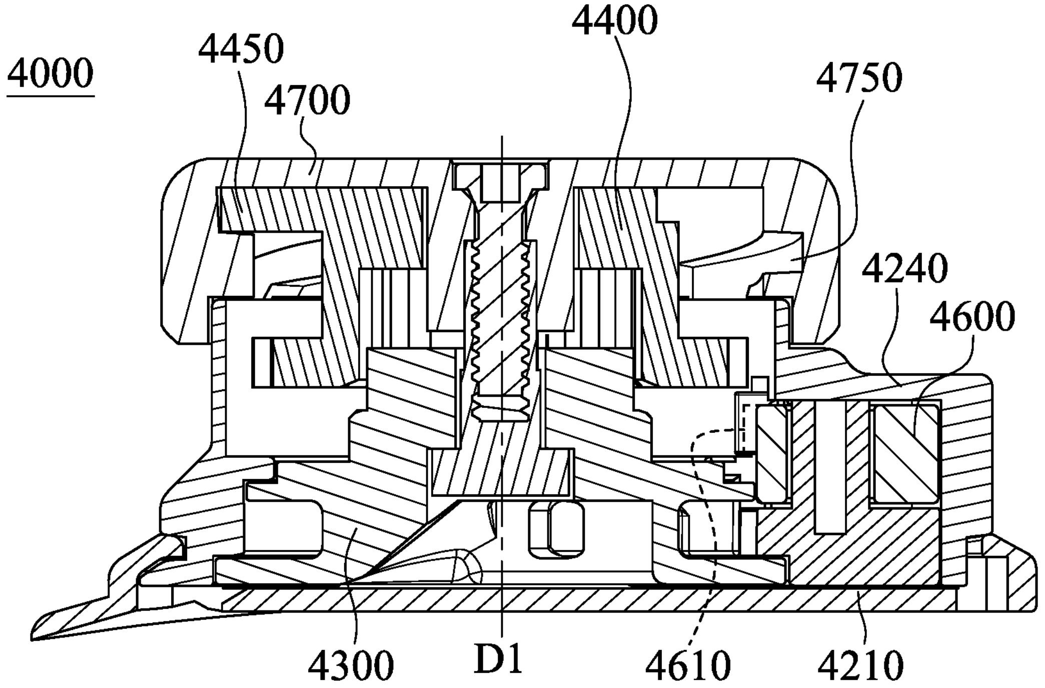
FIG. 23 is another cross-section side view showing the fastening device of the fourth embodiment of FIG. 19.

FIG. 23 is another cross-section side view showing the fastening device 4000 of the fourth embodiment of FIG. 19. As shown in FIG. 22, the wheel 4400 is in a lower position, and the first combining teeth 4420 are engaged with the second combining teeth 4320. As the user would like to tension the lace, the knob 4700 may be rotated in the tensioning direction A2 to allow the ratchet teeth 4410 to displace the ratchet element 4600. Consequently, the ratchet arm 4610 is disengaged from the ratchet teeth 4410, and the spool 4300 may be rotated in the tensioning direction A2 to tension the lace. As the user releases the knob 4700, the ratchet arm 4610 is engaged with the ratchet teeth 4410, and the spool 4300 is prohibited from rotating in the releasing direction A1, such that the lace cannot be released.

On the contrary, as shown in FIG. 23, as the knob 4700 is rotated in the releasing direction A1, the wheel 4400 cannot rotate accordingly owing to the restriction of the ratchet element 4600, the knob 4700 rotates relative to the wheel 4400, and the guiding portion 4450 is guided by the guiding track 4750, thereby allowing the wheel 4400 to move upward to an upper position. Meanwhile, the first combining teeth 4420 are disengaged from the second combining teeth 4320, and the spool 4300 may be rotated freely to fully release the lace.

Figure 24:
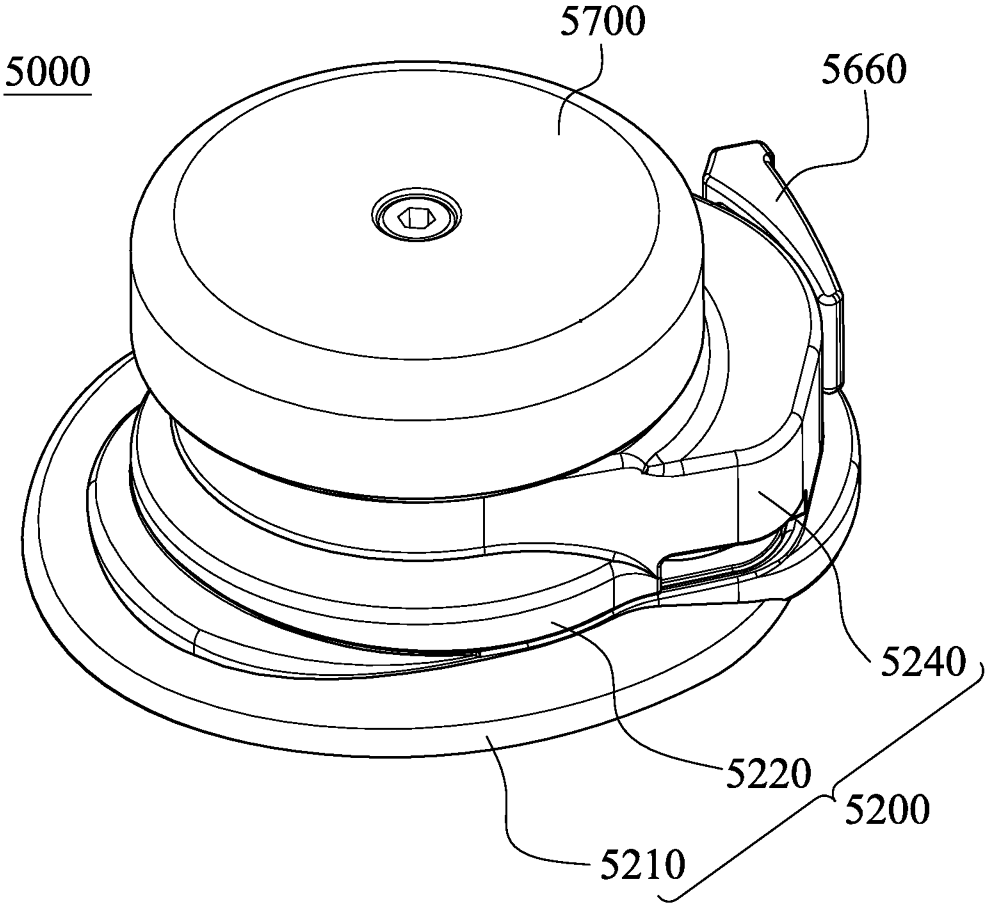
FIG. 24 is a three-dimensional schematic view showing a fastening device according to a fifth embodiment of the present disclosure.
Figure 25:
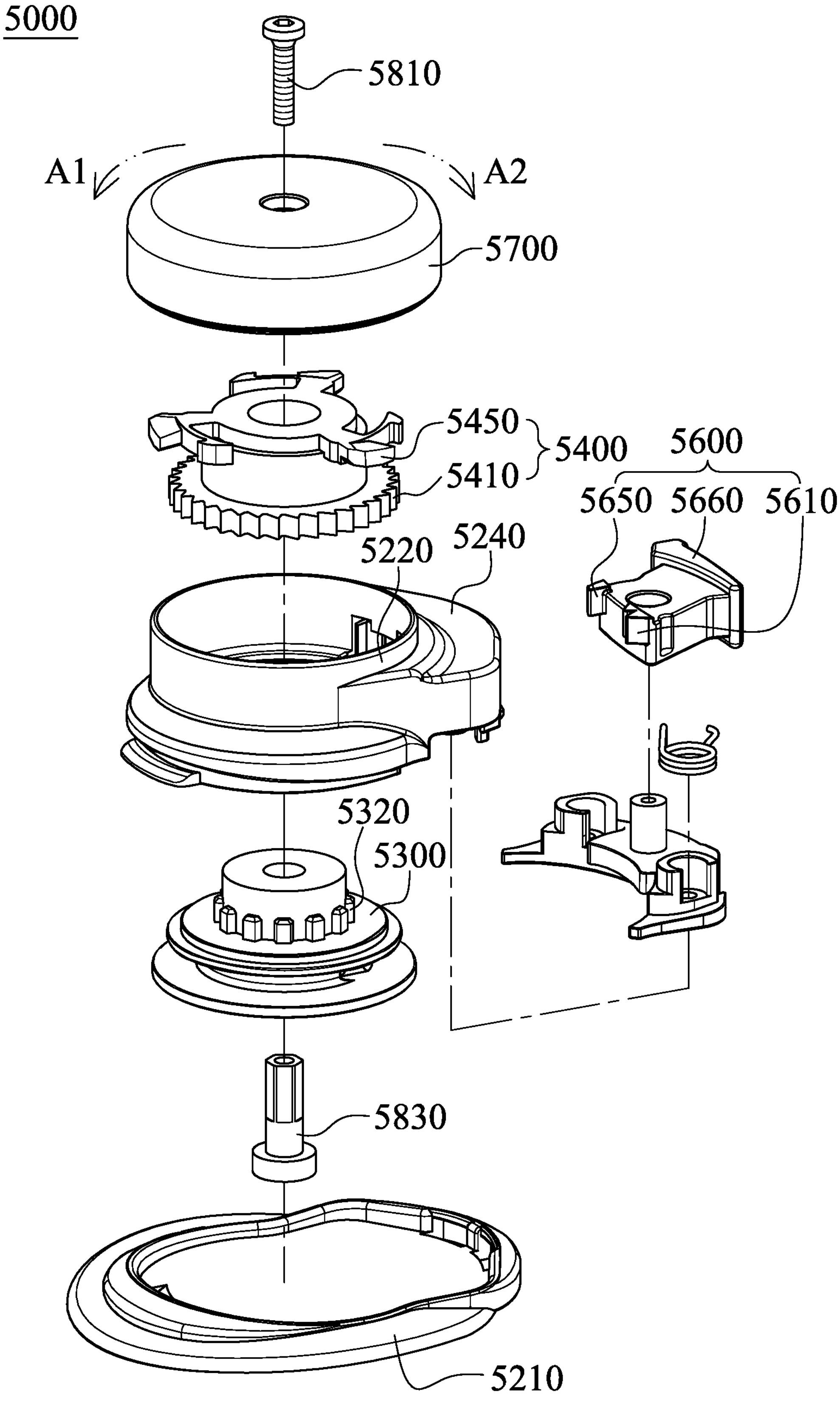
FIG. 25 is one exploded view showing the fastening device of the fifth embodiment of FIG. 24.
Figure 26:
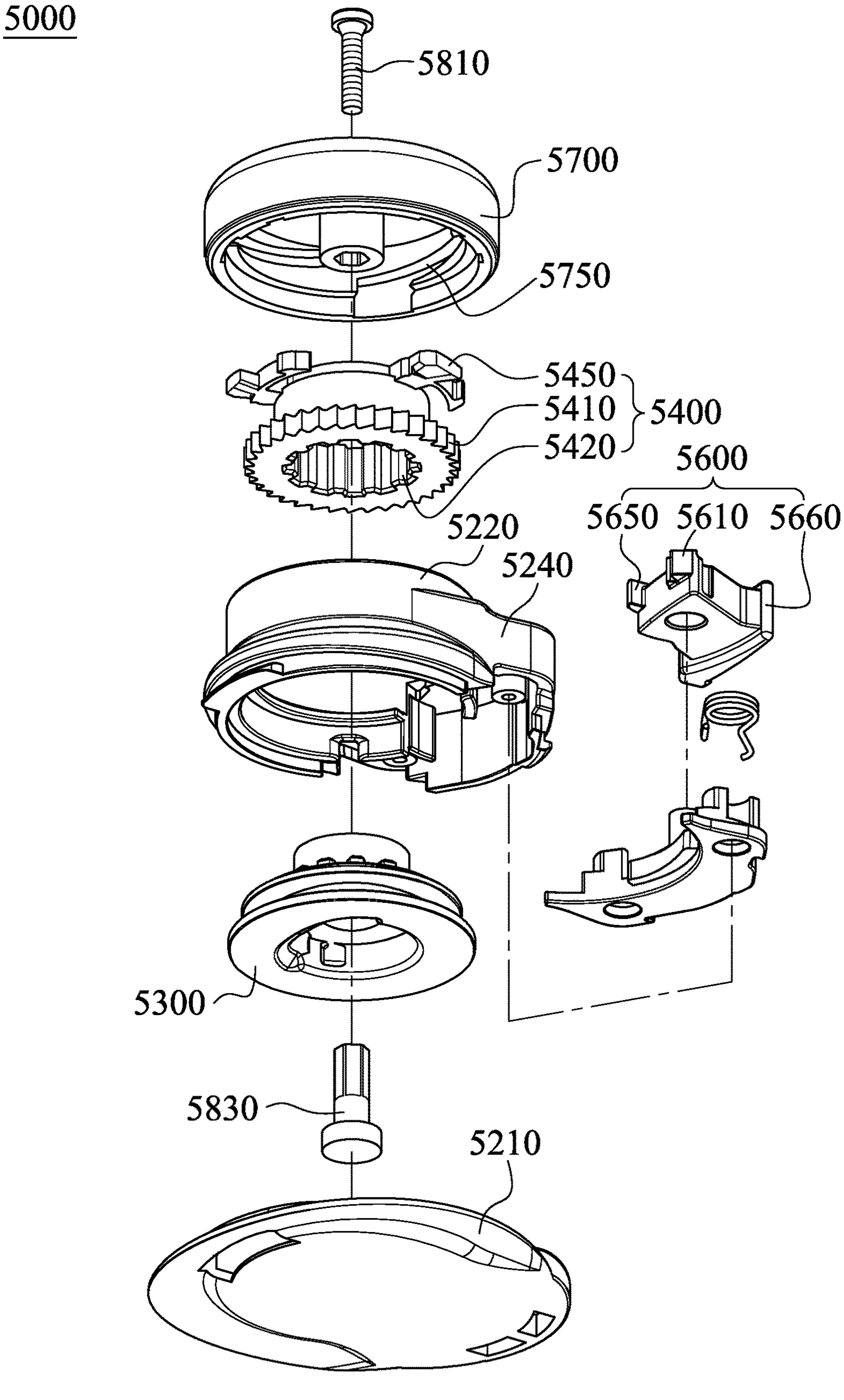
FIG. 26 is another exploded view showing the fastening device of the fifth embodiment of FIG. 24.

FIG. 24 is a three-dimensional schematic view showing a fastening device 5000 according to a fifth embodiment of the present disclosure. FIG. 25 is one exploded view showing the fastening device 5000 of the fifth embodiment of FIG. 24. FIG. 26 is another exploded view showing the fastening device 5000 of the fifth embodiment of FIG. 24. The fastening device 5000 of the fifth embodiment is similar to the fastening device 1000 of the first embodiment, and includes a case 5200, a spool 5300, a wheel 5400, a knob 5700, a ratchet element 5600 and a connecting set. The case 5200 includes an annular wall 5220, a cover 5240 and a base 5210. The details of similar structures will not be repeated. The difference is that the fastening device 5000 does not include the swinging arm 1100 as the fastening device 1000, and the ratchet element 5600 further includes a stopping tooth 5650 and a pressing portion 5660 in addition to the ratchet arm 5610. The pressing portion 5660 extends to an outside of the sub-space via a hole of the cover 5240, and the stopping tooth 5650 is so configured that the stopping tooth 5650 and the ratchet arm 5610 are not engaged with the ratchet teeth 5410 at the same time. Moreover, the connecting set includes a screw bar 5810 and a central shaft 5830, but the structure of the central shaft 5830 is different.

Furthermore, the fastening device 5000 can achieve a goal of fully releasing the lace via rotating the knob 5700 as the fastening device 4000. Hence, the wheel 5400 may also include guiding portions 5450, and the knob 5700 includes guiding tracks 5750 corresponding to the guiding portions 5450.

Figure 27:
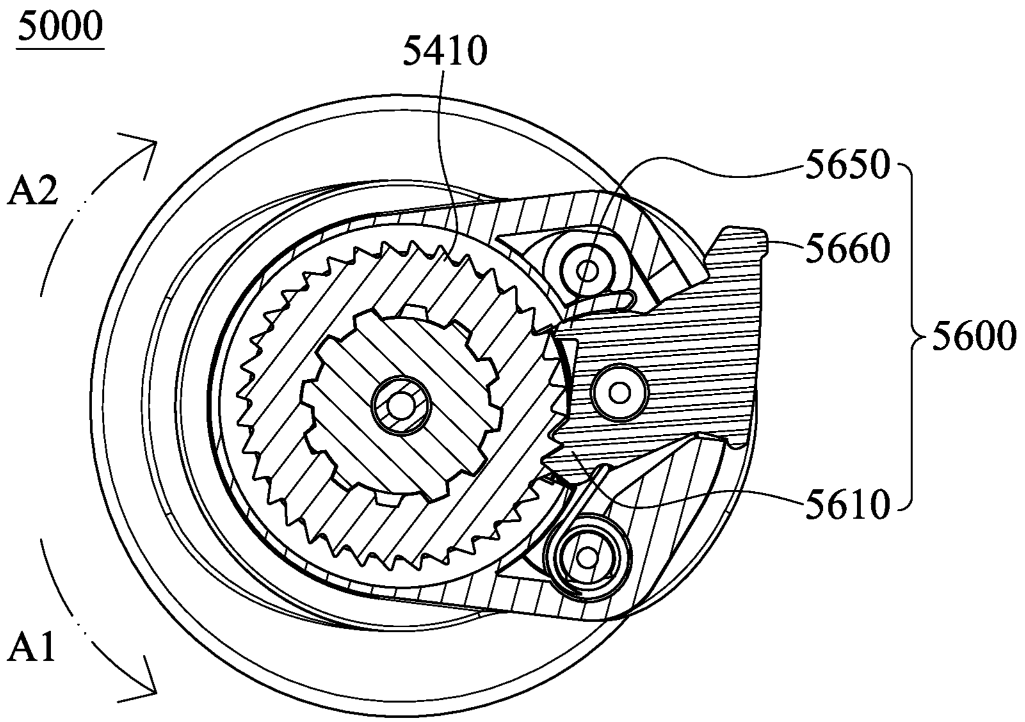
FIG. 27 is one cross-section top view showing the fastening device of the fifth embodiment of FIG. 24.
Figure 28:
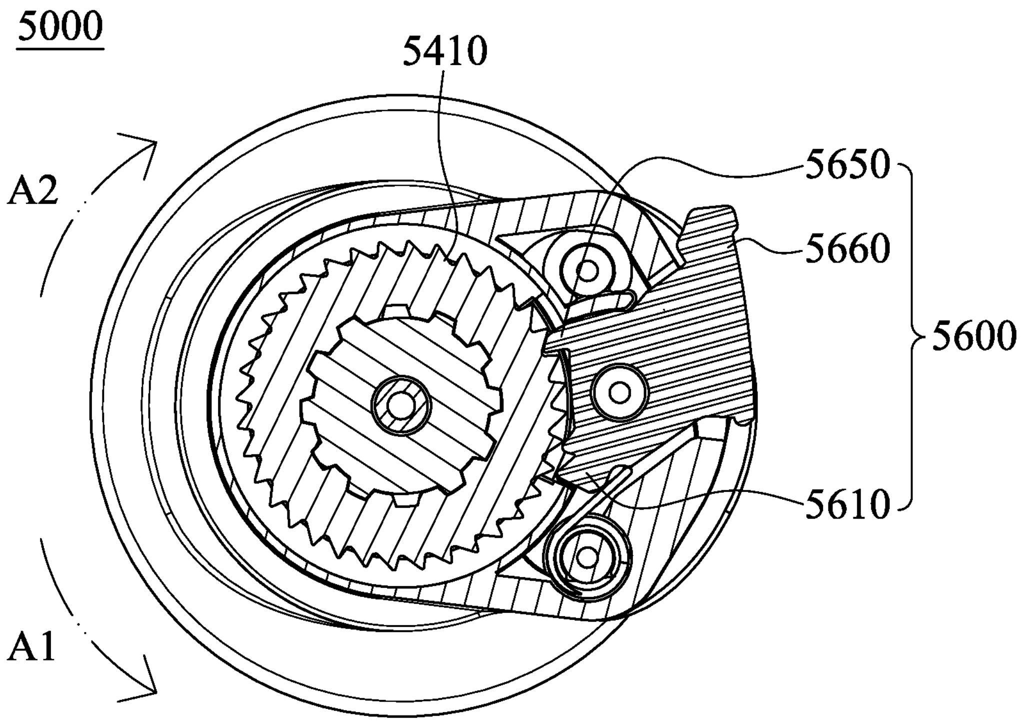
FIG. 28 is another cross-section top view showing the fastening device of the fifth embodiment of FIG. 24.
Figure 29:
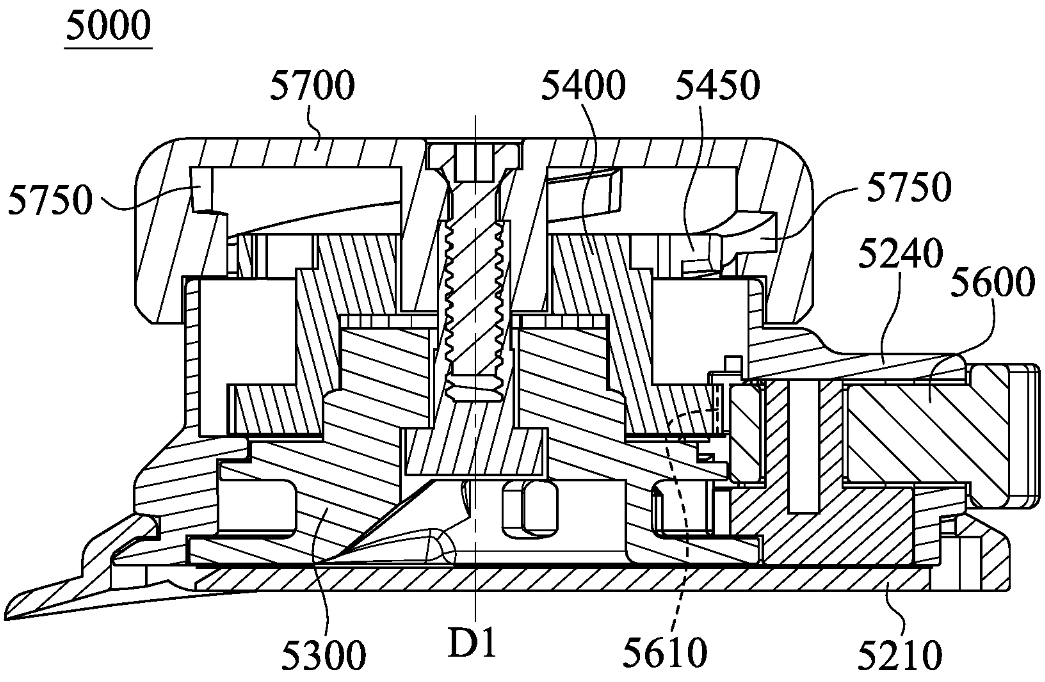
FIG. 29 is one cross-section side view showing the fastening device of the fifth embodiment of FIG. 24.
Figure 30:
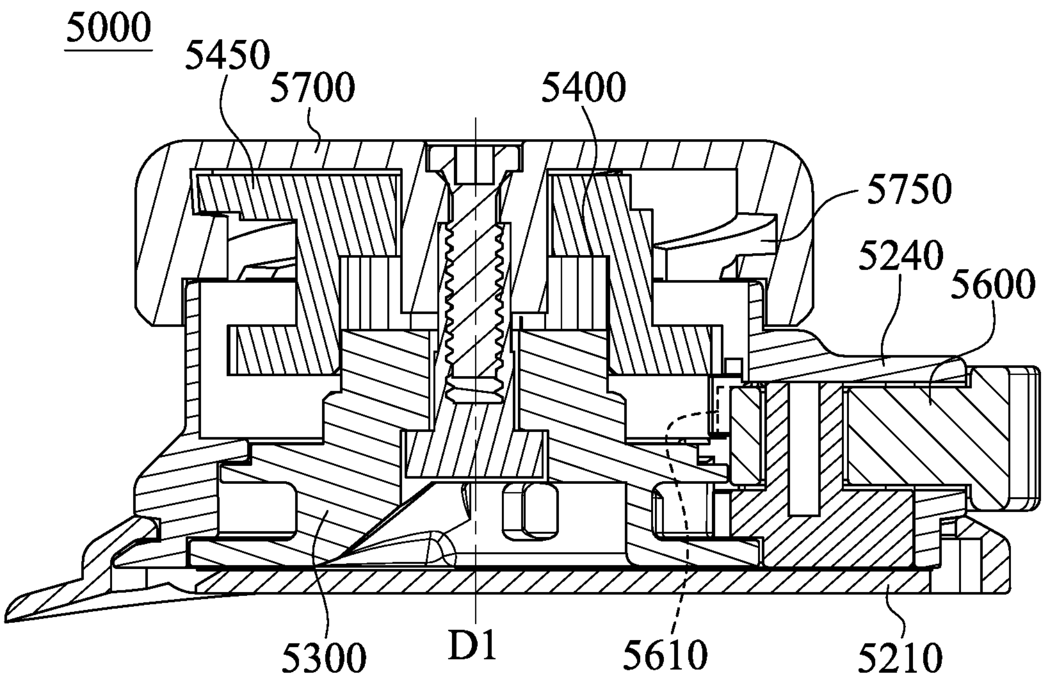
FIG. 30 is another cross-section side view showing the fastening device of the fifth embodiment of FIG. 24.

FIG. 27 is one cross-section top view showing the fastening device 5000 of the fifth embodiment of FIG. 24. FIG. 28 is another cross-section top view showing the fastening device 5000 of the fifth embodiment of FIG. 24. FIG. 29 is one cross-section side view showing the fastening device 5000 of the fifth embodiment of FIG. 24. FIG. 30 is another cross-section side view showing the fastening device 5000 of the fifth embodiment of FIG. 24. As shown in FIGS. 27 and 29, the wheel 5400 is in a lower position, and the first combining teeth 5420 are engaged with the second combining teeth 5320. As the user would like to tension the lace, the knob 5700 may be rotated in the tensioning direction A2 to allow the ratchet teeth 5410 to displace the ratchet element 5600.

Consequently, the ratchet arm 5610 is disengaged from the ratchet teeth 5410, and the spool 5300 may be rotated in the tensioning direction A2 to tension the lace. As the user releases the knob 5700, the ratchet arm 5610 is engaged with the ratchet teeth 5410, and the spool 5300 is prohibited from rotating in the releasing direction A1, such that the lace cannot be released.

In addition, the fastening device 5000 may also have a function of incrementally releasing the lace. As shown in FIG. 28, the pressing portion 5660 may be pressed inward, the ratchet element 5600 swings, the ratchet arm 5610 separates from the ratchet teeth 5410, thereby allowing the spool 5300 to be rotated in the releasing direction A1 by the tension of the lace, and the stopping tooth 5650 will swing inward to engage with the ratchet teeth 5410, such that the lace may be incrementally released.

On the contrary, as shown in FIG. 30, as the knob 5700 is rotated in the releasing direction A1, the wheel 5400 cannot rotate accordingly owing to the restriction of the ratchet element 5600, the knob 5700 rotates relative to the wheel 5400, and the wheel 5400 moves upward to an upper position. Meanwhile, the ratchet teeth 5410 are disengaged from the ratchet arm 5610, the first combining teeth 5420 are disengaged from the second combining teeth 5320, and the spool 5300 may be rotated freely to fully release the lace.

Figure 31:
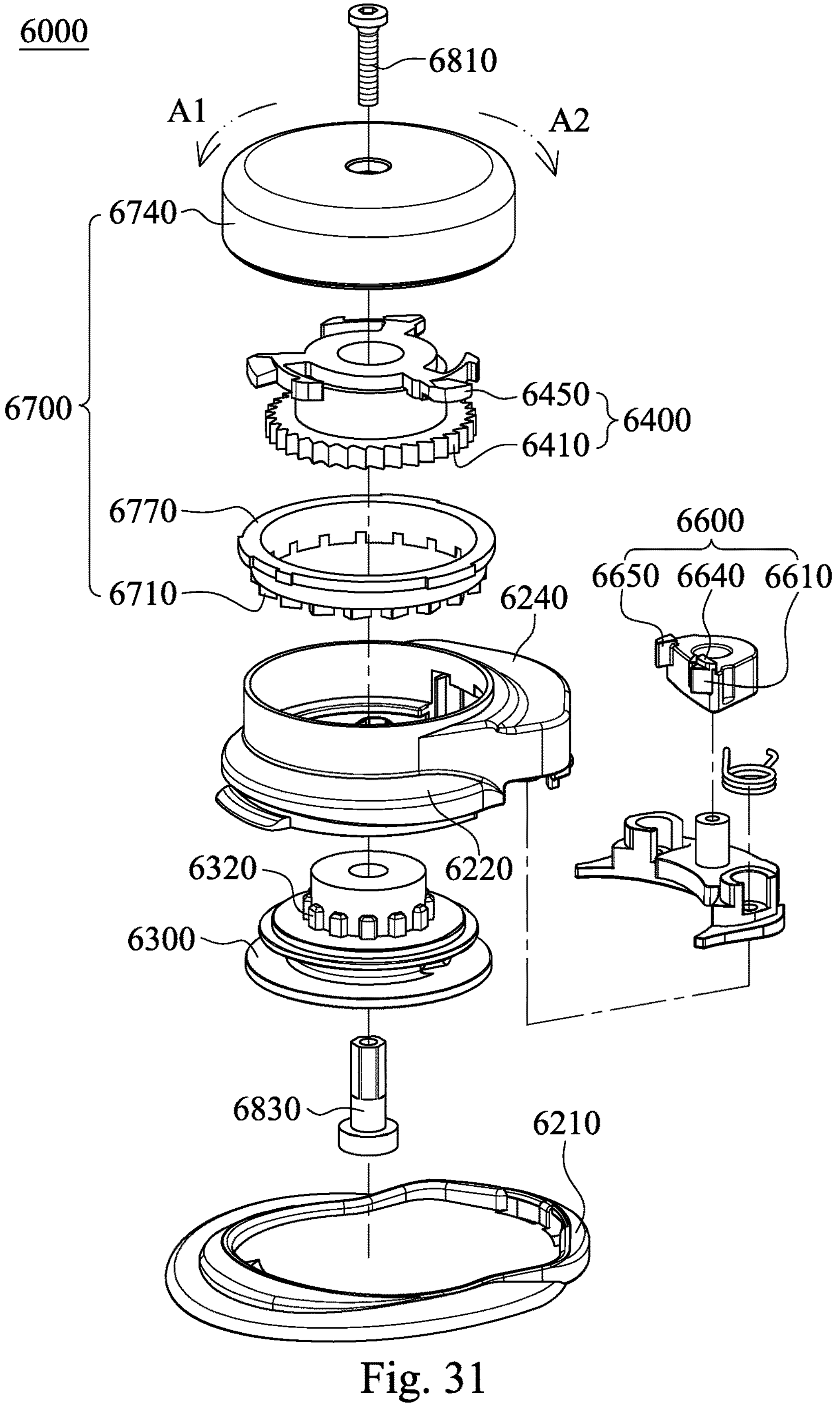
FIG. 31 is one exploded view showing a fastening device according a sixth embodiment of the present disclosure.
Figure 32:
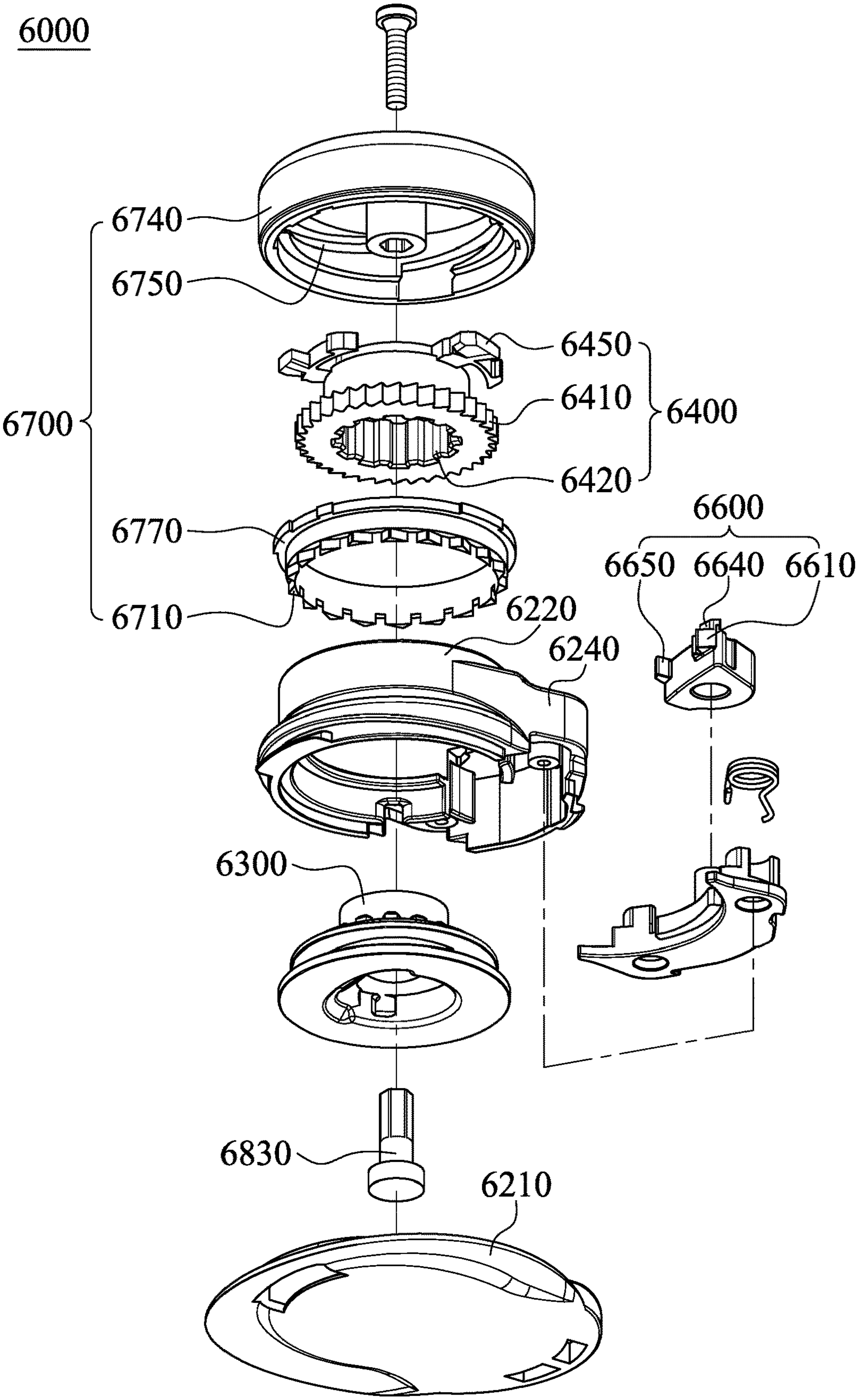
FIG. 32 is another exploded view showing the fastening device of the sixth embodiment of FIG. 31.

FIG. 31 is one exploded view showing a fastening device 6000 according a sixth embodiment of the present disclosure. FIG. 32 is another exploded view showing the fastening device 6000 of the sixth embodiment of FIG. 31. The fastening device 6000 of the sixth embodiment is similar to the fastening device 1000 of the first embodiment, and includes a case, a spool 6300, a knob 6700, a wheel 6400, a ratchet element 6600 and a connecting set. The case includes an annular wall 6220, a cover 6240 and a base 6210. The details of similar structures will not be repeated. The difference is that the fastening device 6000 does not include the swinging arm 1100 as the fastening device 1000, the cover 6240 does not include a hole as the cover 1240, the knob 6700 may include a covering portion 6740 and a ring body 6770, the ring body 6770 is connected to the covering portion 6740, the knob teeth 6710 are located at the ring body 6770, and the ratchet element 6600 further includes a stopping tooth 6650 in addition to the ratchet arm 6610 with the configuration that the stopping tooth 6650 and the ratchet arm 6610 are not engaged with the ratchet teeth 6410 at the same time. Moreover, the connecting set includes a screw bar 6810 and a central shaft 6830, but the structure of the central shaft 6830 is different.

Furthermore, the fastening device 6000 can achieve a goal of fully releasing the lace via rotating the knob 6700 as the fastening device 5000. Hence, the wheel 6400 may also include guiding portions 6450, and the knob 6700 includes guiding tracks 6750 corresponding to the guiding portions 6450.

Figure 33:
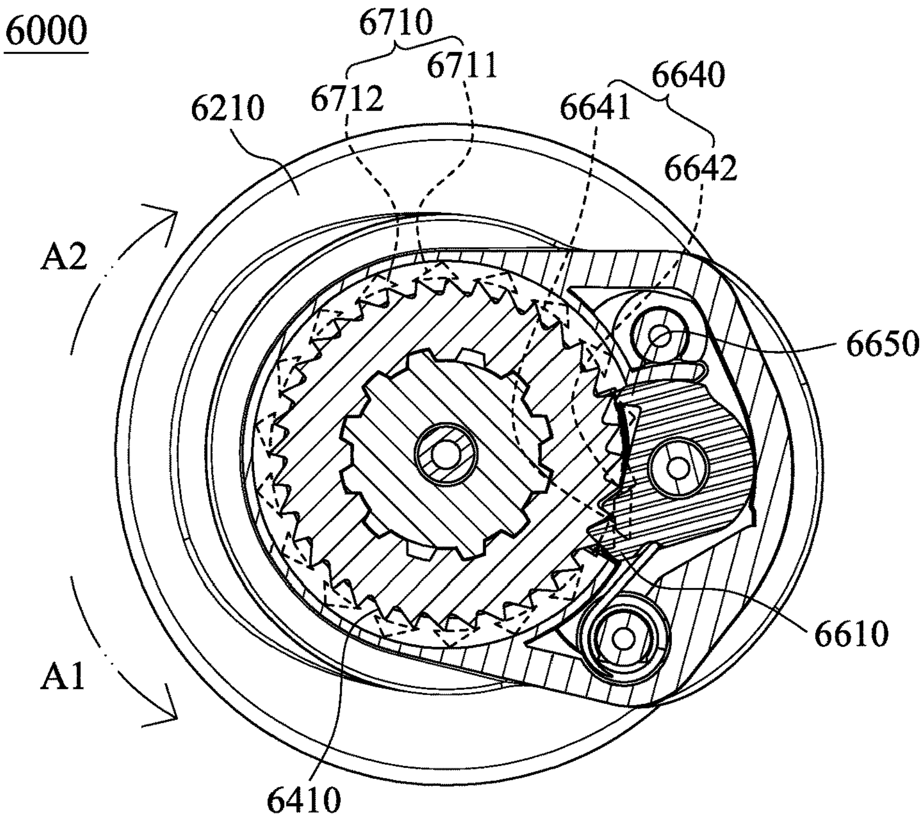
FIG. 33 is one cross-section top view showing the fastening device of the sixth embodiment of FIG. 31.
Figure 34:
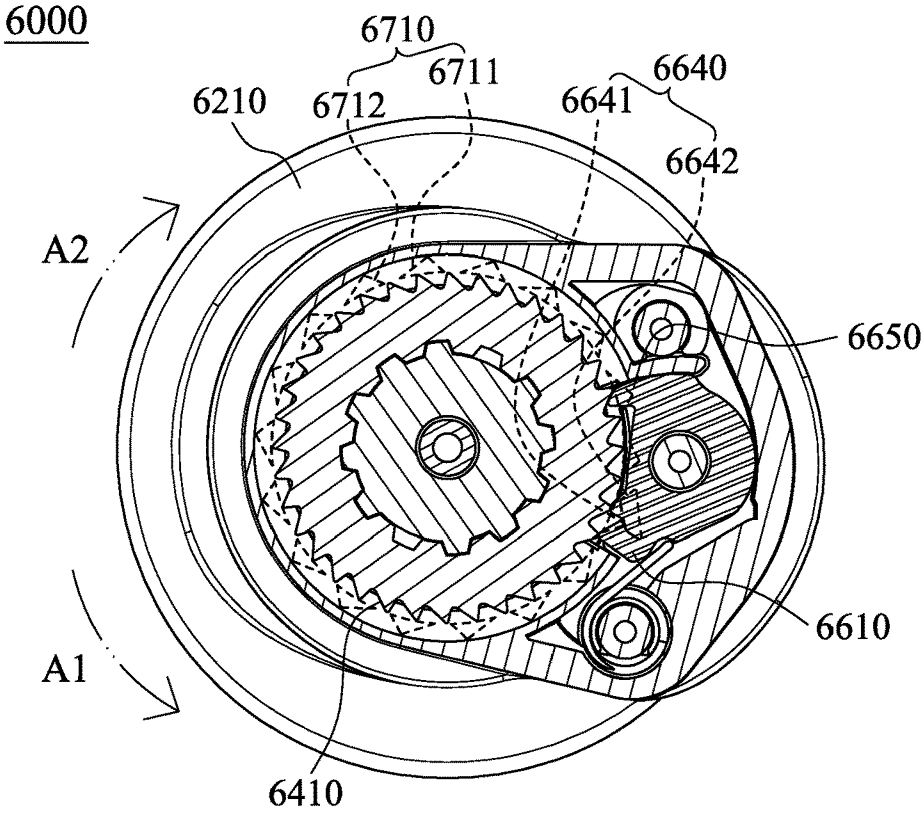
FIG. 34 is another cross-section top view showing the fastening device of the sixth embodiment of FIG. 31.
Figure 35:
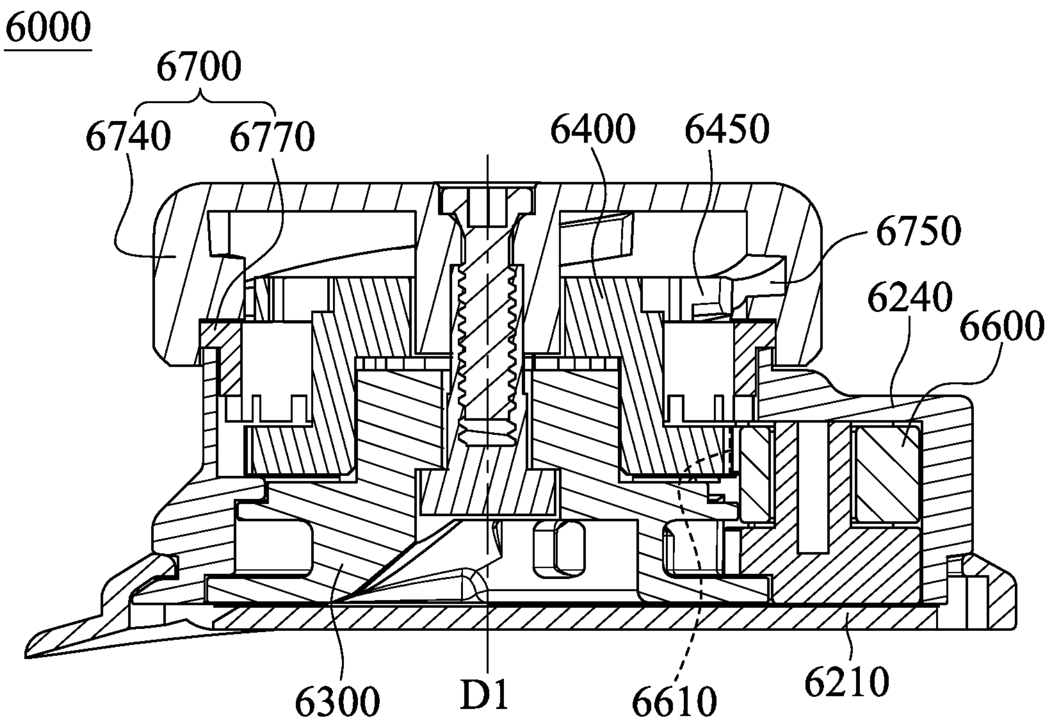
FIG. 35 is one cross-section side view showing the fastening device of the sixth embodiment of FIG. 31.
Figure 36:
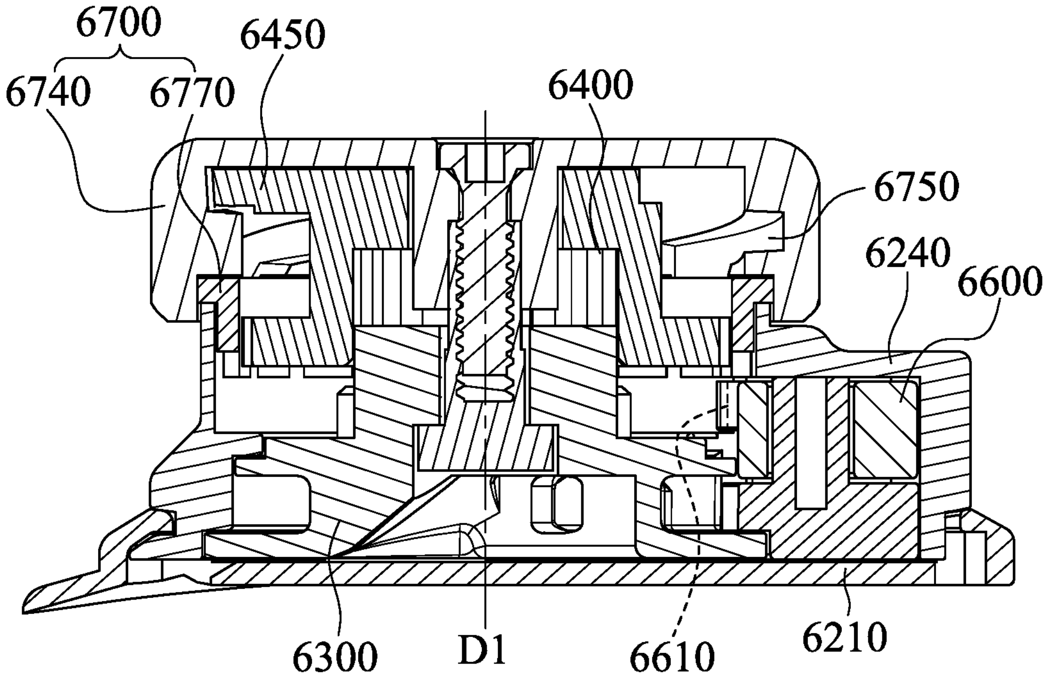
FIG. 36 is another cross-section side view showing the fastening device of the sixth embodiment of FIG. 31.

FIG. 33 is one cross-section top view showing the fastening device 6000 of the sixth embodiment of FIG. 31. FIG. 34 is another cross-section top view showing the fastening device 6000 of the sixth embodiment of FIG. 31. FIG. 35 is one cross-section side view showing the fastening device 6000 of the sixth embodiment of FIG. 31. FIG. 36 is another cross-section side view showing the fastening device 6000 of the sixth embodiment of FIG. 31. As shown in FIGS. 33 and 35, the wheel 6400 is in a lower position, and the first combining teeth 6420 are engaged with the second combining teeth 6320. As the user would like to tension the lace, the knob 6700 may be rotated in the tensioning direction A2 to allow the ratchet teeth 6410 to displace the ratchet element 6600. Consequently, the ratchet arm 6610 is disengaged from the ratchet teeth 6410, the spool 6300 may be rotated in the tensioning direction A2 to tension the lace, and relative sliding between the second surface 6712 of the knob tooth 6710 and the second sliding surface 6642 of the sliding portion 6640 will occur, which does not stop tensioning the lace. As the user releases the knob 6700, the ratchet arm 6610 is engaged with the ratchet teeth 6410, and the spool 6300 is prohibited from rotating in the releasing direction A1, such that the lace cannot be released.

Moreover, as shown in FIG. 34, as the user would like to rotate the knob 6700 in the releasing direction A1, the first surface 6711 of one of the knob teeth 6710 that is engaged with the sliding portion 6640 pushes the first sliding surface 6641 of the sliding portion 6640, the first sliding surface 6641 slides relative to the first surface 6711 to allow the sliding portion 6640 to separate from the one of the knob teeth 6710. Meanwhile, the ratchet element 6600 swings, the ratchet arm 6610 swings outward and separates from the ratchet teeth 6410, thereby allowing the spool 6300 to be rotated in the releasing direction A1 by the tension of the lace, and the stopping tooth 6650 swings inward to engage with the ratchet teeth 6410, thereby incrementally releasing the lace.

On the contrary, as shown in FIG. 36, as the knob 6700 is rotated in the releasing direction A1, the wheel 6400 cannot rotate accordingly owing to the restriction of the ratchet element 6600, the knob 6700 rotates relative to the wheel 6400, and the wheel 6400 moves upward to an upper position. Meanwhile, the ratchet teeth 6410 are disengaged from the ratchet arm 6610, the first combining teeth 6420 are disengaged from the second combining teeth 6320, and the spool 6300 may be rotated freely to fully release the lace.

Figure 37:
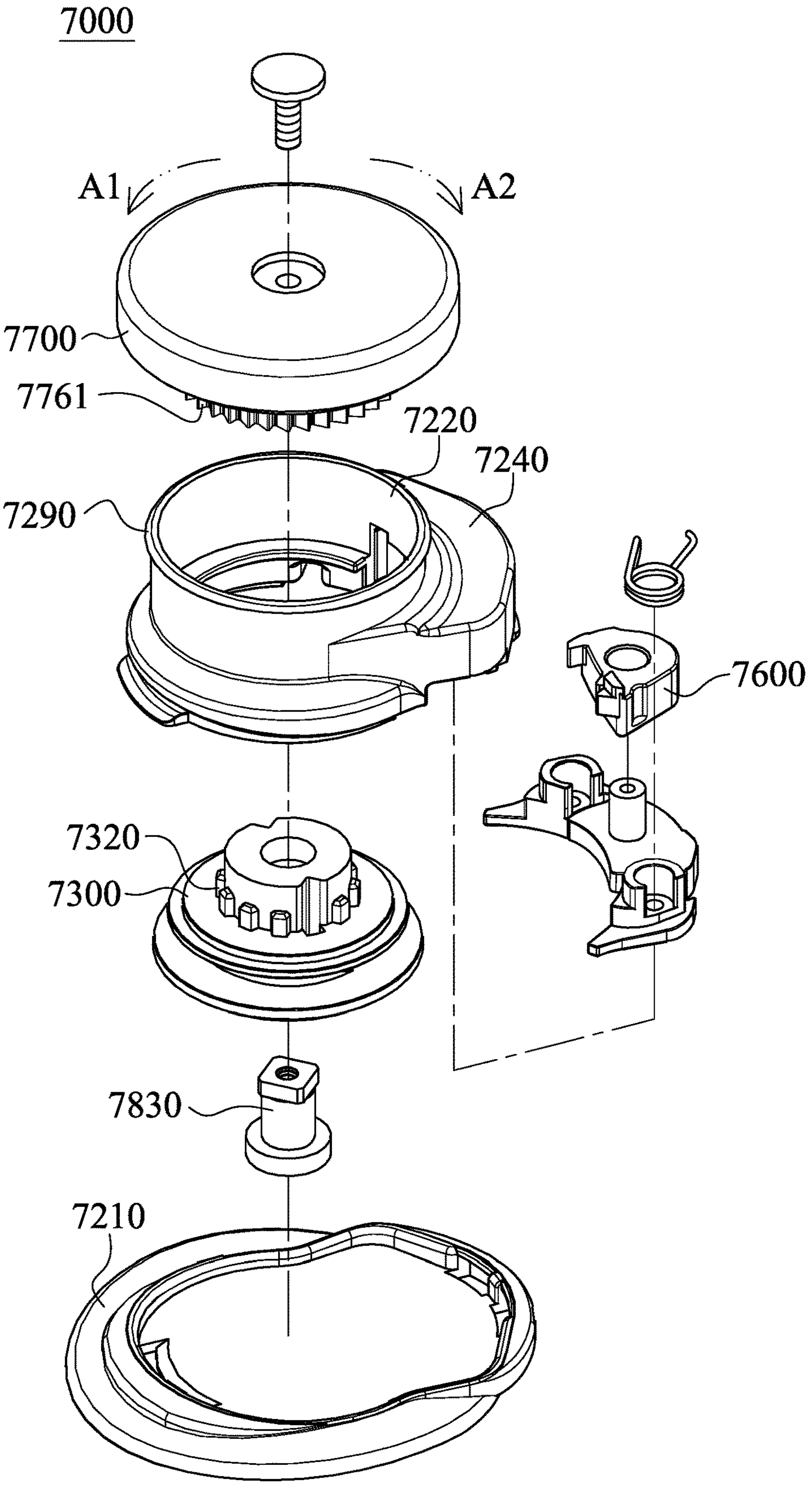
FIG. 37 is one exploded view showing a fastening device according a seventh embodiment of the present disclosure.
Figure 38:
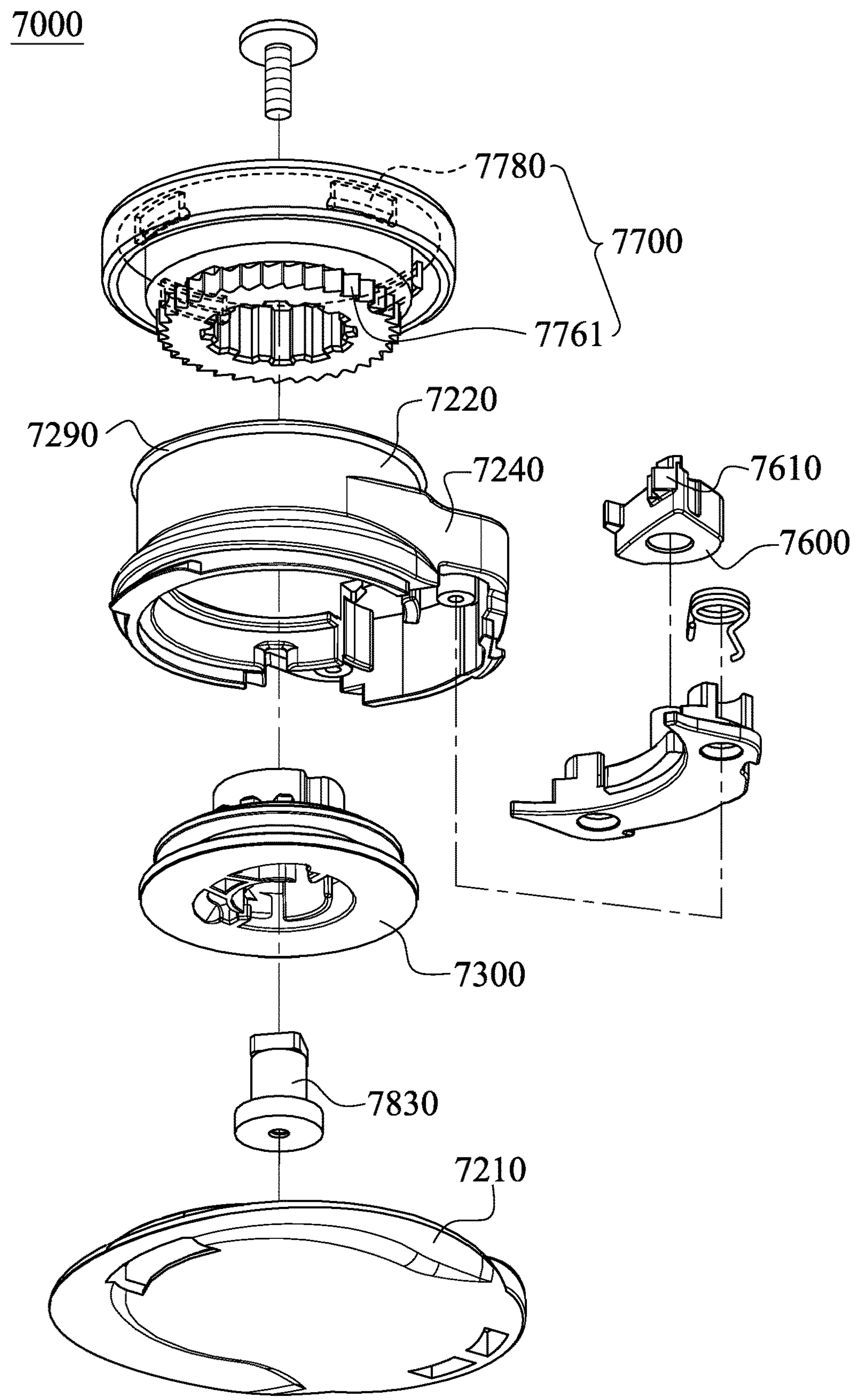
FIG. 38 is another exploded view showing the fastening device of the seventh embodiment of FIG. 37.

FIG. 37 is one exploded view showing a fastening device 7000 according a seventh embodiment of the present disclosure. FIG. 38 is another exploded view showing the fastening device 7000 of the seventh embodiment of FIG. 37. The fastening device 7000 of the seventh embodiment is similar to the fastening device 1000 of the first embodiment, and includes a case, a spool 7300, a knob 7700 and a ratchet element 7600. The case includes an annular wall 7220, a cover 7240 and a base 7210. The details of similar structures will not be repeated. The difference is that the fastening device 7000 does not include the swinging arm 1100 as the fastening device 1000, and the cover 7240 does not include a hole as the cover 1240. In addition, the structure of the central shaft 7830 of the fastening device 7000 is different, and full release of the lace can be achieved by pulling the knob 7700 upward.

The knob 7700 may include a covering portion, a protruding ring, a plurality of ratchet teeth 7761 and a plurality of engaging pawls 7780. The ratchet teeth 7761 are located at an outer surface of the protruding ring, and engaging pawls 7780 are located in the inner wall of the covering portion and face toward the outer surface of the protruding ring. The case may further include an engaging ring 7290 located at an upper end of the annular wall 7220 and corresponding to the engaging pawls 7780.

Figure 39:
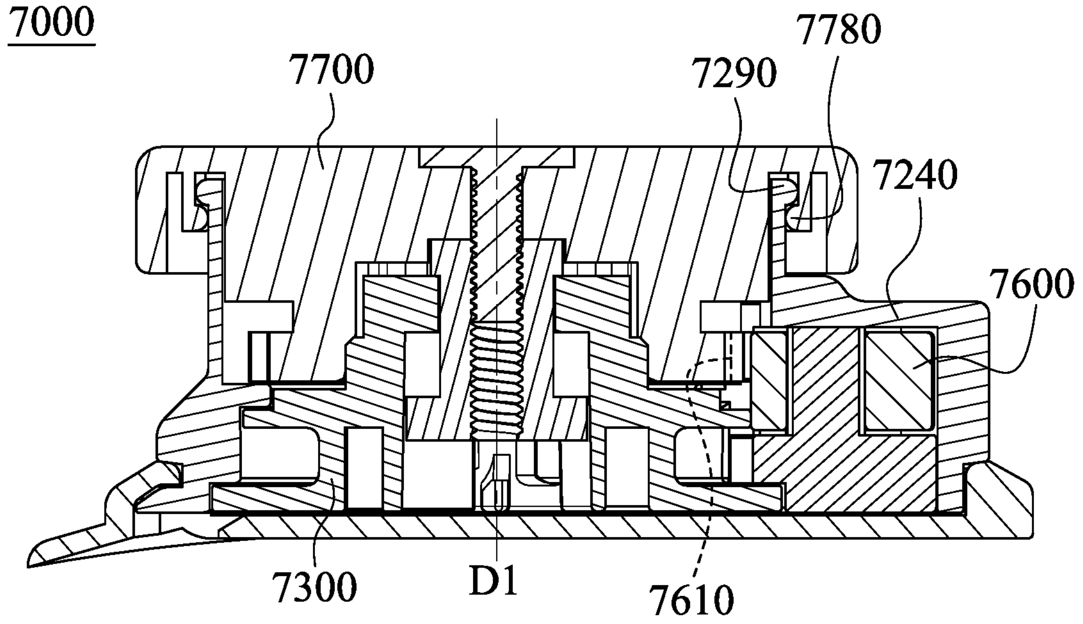
FIG. 39 is one cross-section side view showing the fastening device of the seventh embodiment of FIG. 37.
Figure 40:
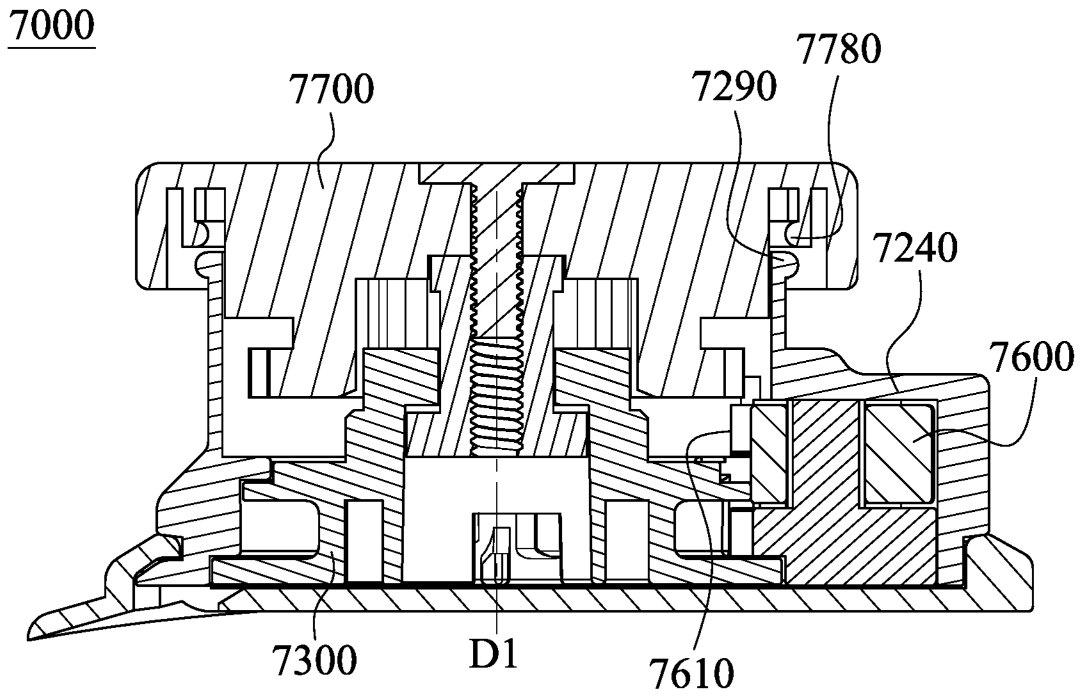
FIG. 40 is another cross-section side view showing the fastening device of the seventh embodiment of FIG. 37.

FIG. 39 is one cross-section side view showing the fastening device 7000 of the seventh embodiment of FIG. 37. FIG. 40 is another cross-section side view showing the fastening device 7000 of the seventh embodiment of FIG. 37. As shown in FIG. 39, as the knob 7700 is not pulled up along the axial direction D1 and is in the first position, the engaging pawls 7780 are located below the engaging ring 7290. The movements of the knob 7700, the ratchet arm 7610 of ratchet element 7600, the spool 7300 and the ratchet teeth 7761 are similar to the movements of the fastening device 2000 of the second embodiment, rotating the knob 7700 in the tensioning direction A2 may tension the lace, and the details will not be repeated.

Moreover, as shown in FIG. 40, as the knob 7700 is pulled upward along the axial direction D1 by the user to switch to the second position, the engaging pawls 7780 push the engaging ring 7290 and are deformed to switch to be above the engaging ring 7290. The first combining teeth are disengaged from the second combining teeth 7320, and the spool 7300 may be rotated freely to fully release the lace.

Figure 41:
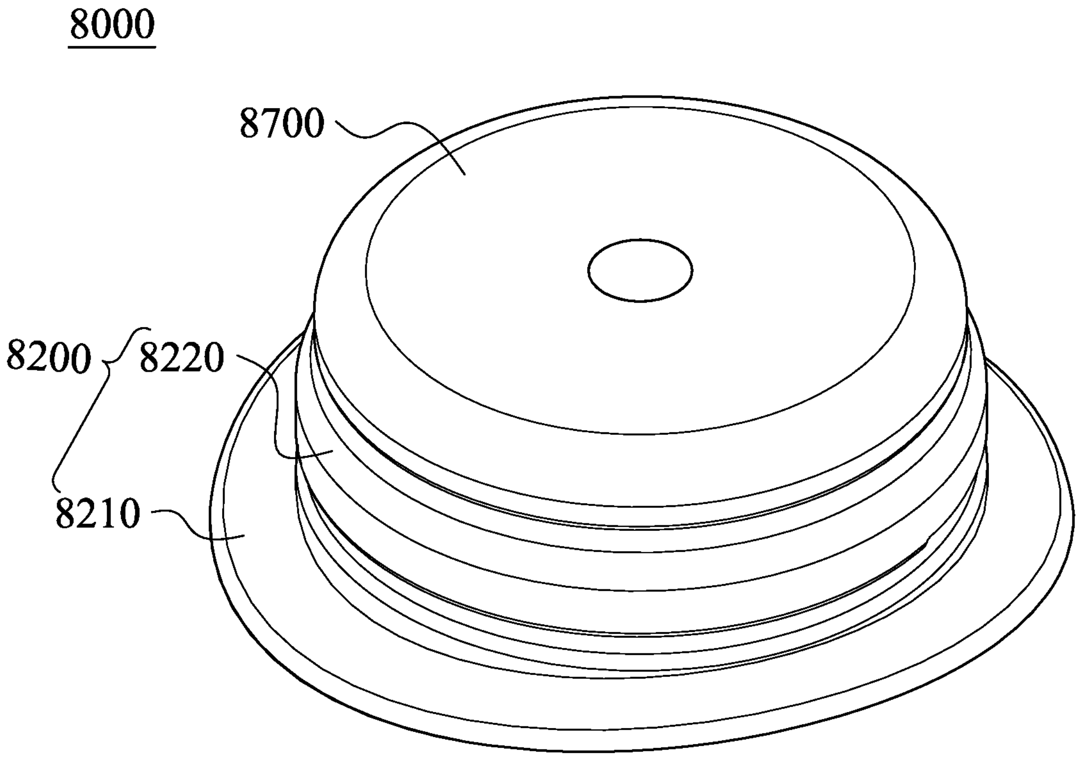
FIG. 41 is a three-dimensional schematic view showing a fastening device according to an eighth embodiment of the present disclosure.
Figure 42:
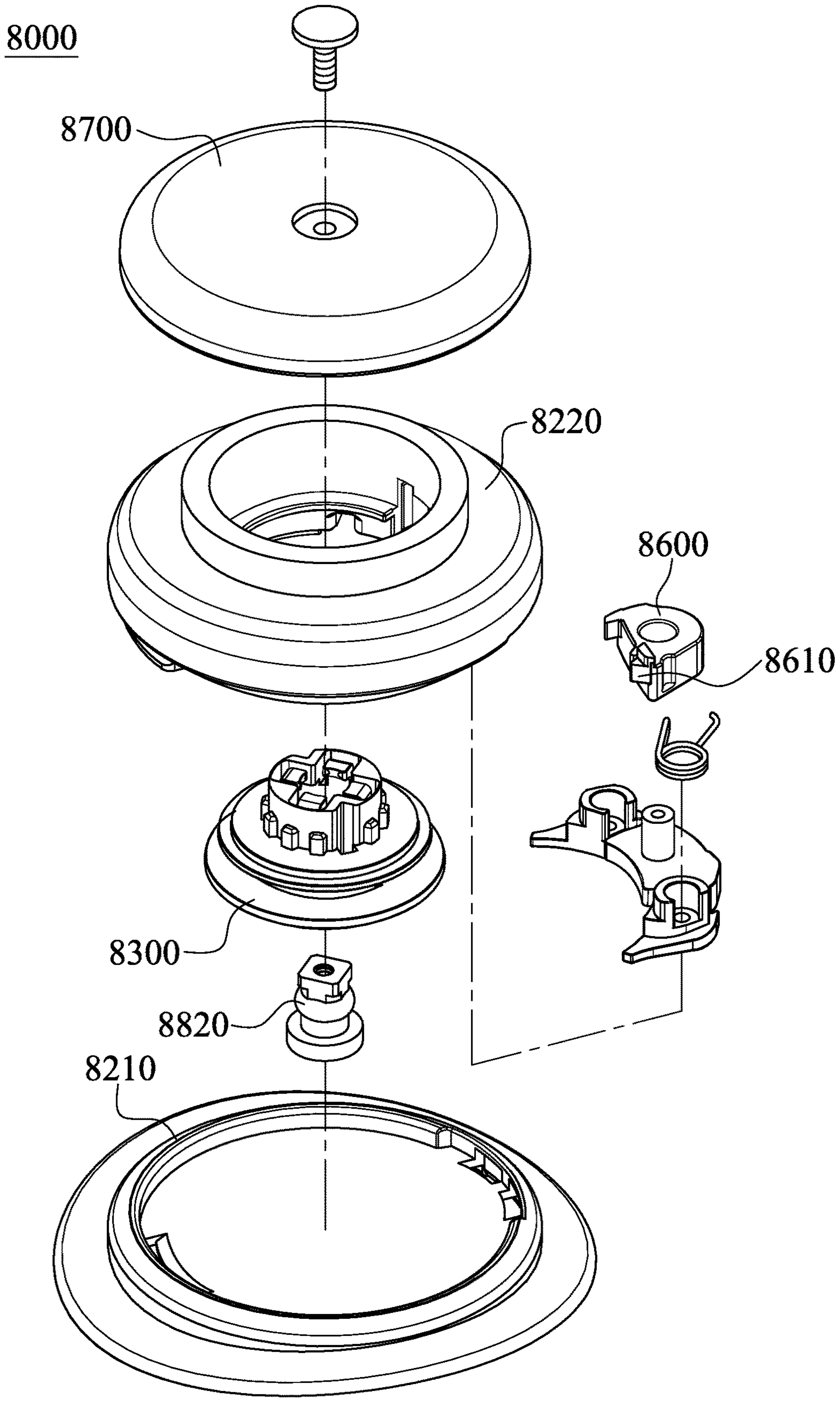
FIG. 42 is one exploded view showing the fastening device of the eighth embodiment of FIG. 41.
Figure 43:
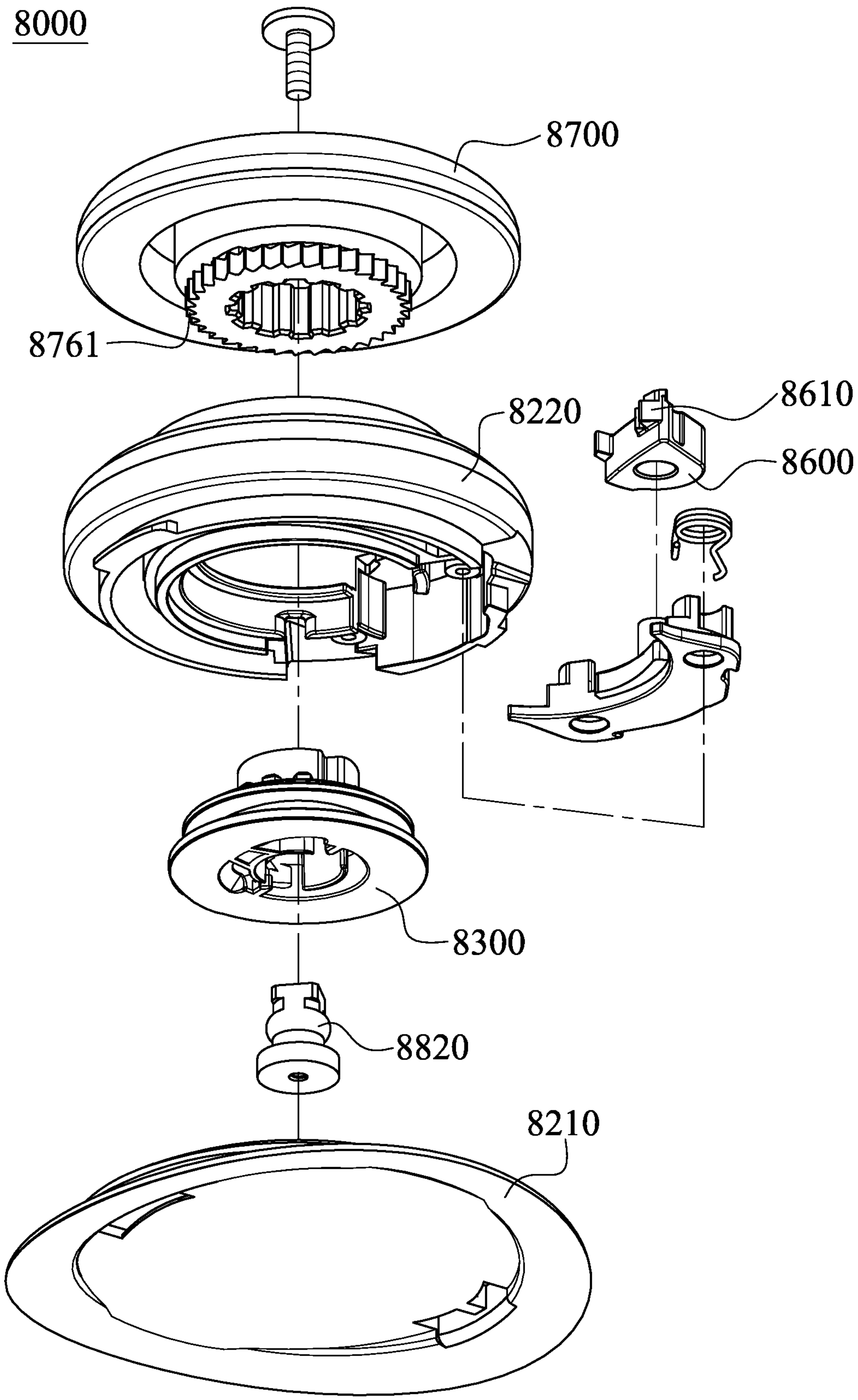
FIG. 43 is another exploded view showing the fastening device of the eighth embodiment of FIG. 41.

FIG. 41 is a three-dimensional schematic view showing a fastening device 8000 according to an eighth embodiment of the present disclosure. FIG. 42 is one exploded view showing the fastening device 8000 of the eighth embodiment of FIG. 41. FIG. 43 is another exploded view showing the fastening device 8000 of the eighth embodiment of FIG. 41. The fastening device 8000 of the eighth embodiment is similar to the fastening device 2000 of the second embodiment, and includes a case 8200, a spool 8300, a knob 8700, a ratchet element 8600 and a positioning shaft 8820. The ratchet element 8600 includes a ratchet arm 8610, and full release of the lace can be achieved by pulling the knob 8700 upward. The details of the similar structure will not be repeated. The difference is that the case 8200 does not include the cover 2240 as the second embodiment, the annular wall 8220 covers the ratchet element 8600, and the base 8210 is circular-shaped.

Figure 44:
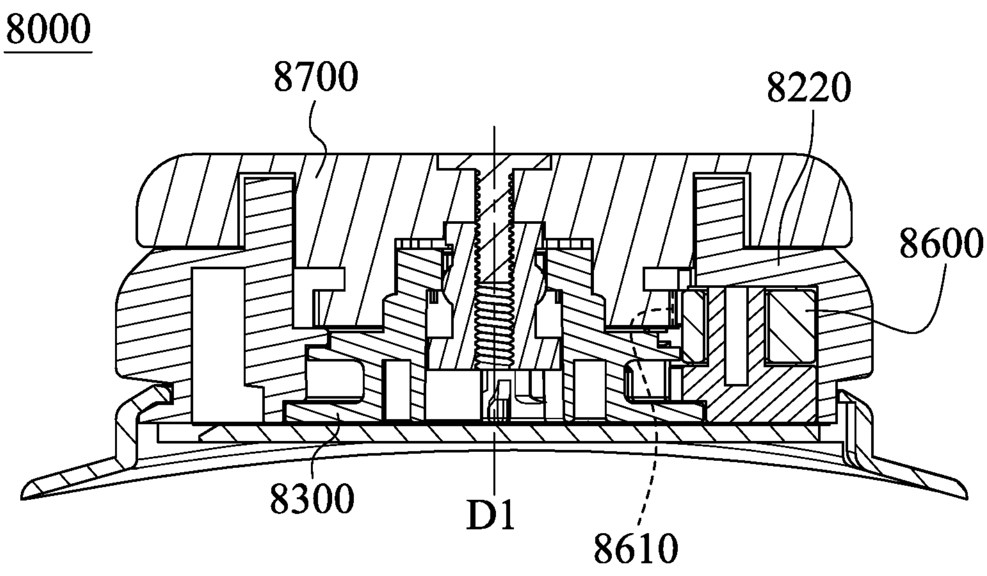
FIG. 44 is one cross-section side view showing the fastening device of the eighth embodiment of FIG. 41.
Figure 45:
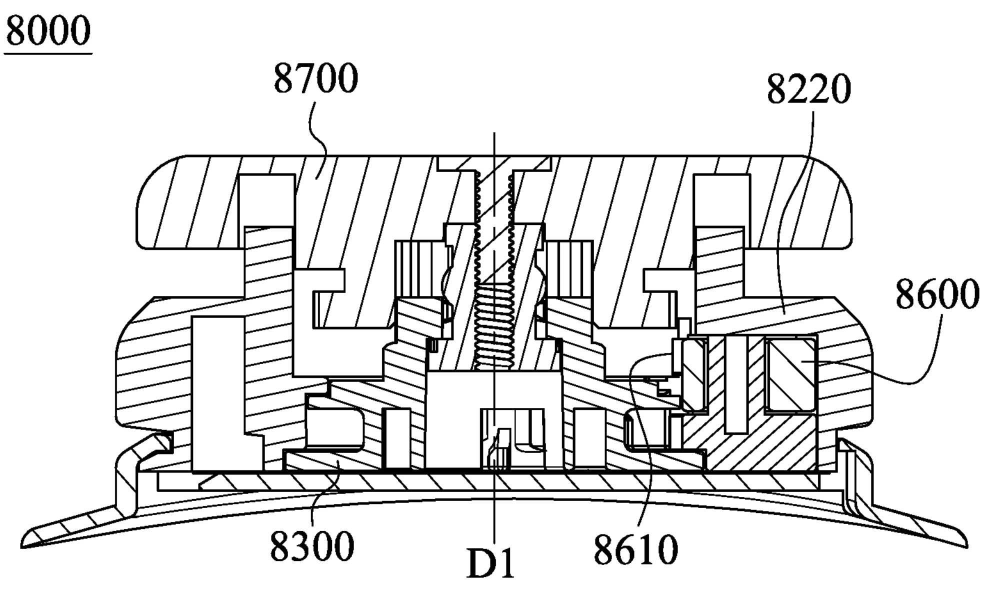
FIG. 45 is another cross-section side view showing the fastening device of the eighth embodiment of FIG. 41.

FIG. 44 is one cross-section side view showing the fastening device 8000 of the eighth embodiment of FIG. 41. FIG. 45 is another cross-section side view showing the fastening device 8000 of the eighth embodiment of FIG. 41. As shown in FIG. 44, as the knob 8700 is not pulled up along the axial direction D1 and is in the first position, the movements of the knob 8700, the ratchet element 8600, the spool 8300 and the ratchet teeth 8761 are similar to the movements of the fastening device 2000 of the second embodiment, rotating the knob 8700 in the tensioning direction A2 may tension the lace, and the details will not be repeated.

Moreover, as shown in FIG. 45, as the knob 8700 is pulled upward along the axial direction D1 by the user to switch to the second position, the first combining teeth are disengaged from the second combining teeth, and the spool 8300 may be rotated freely to fully release the lace.

Figure 46:
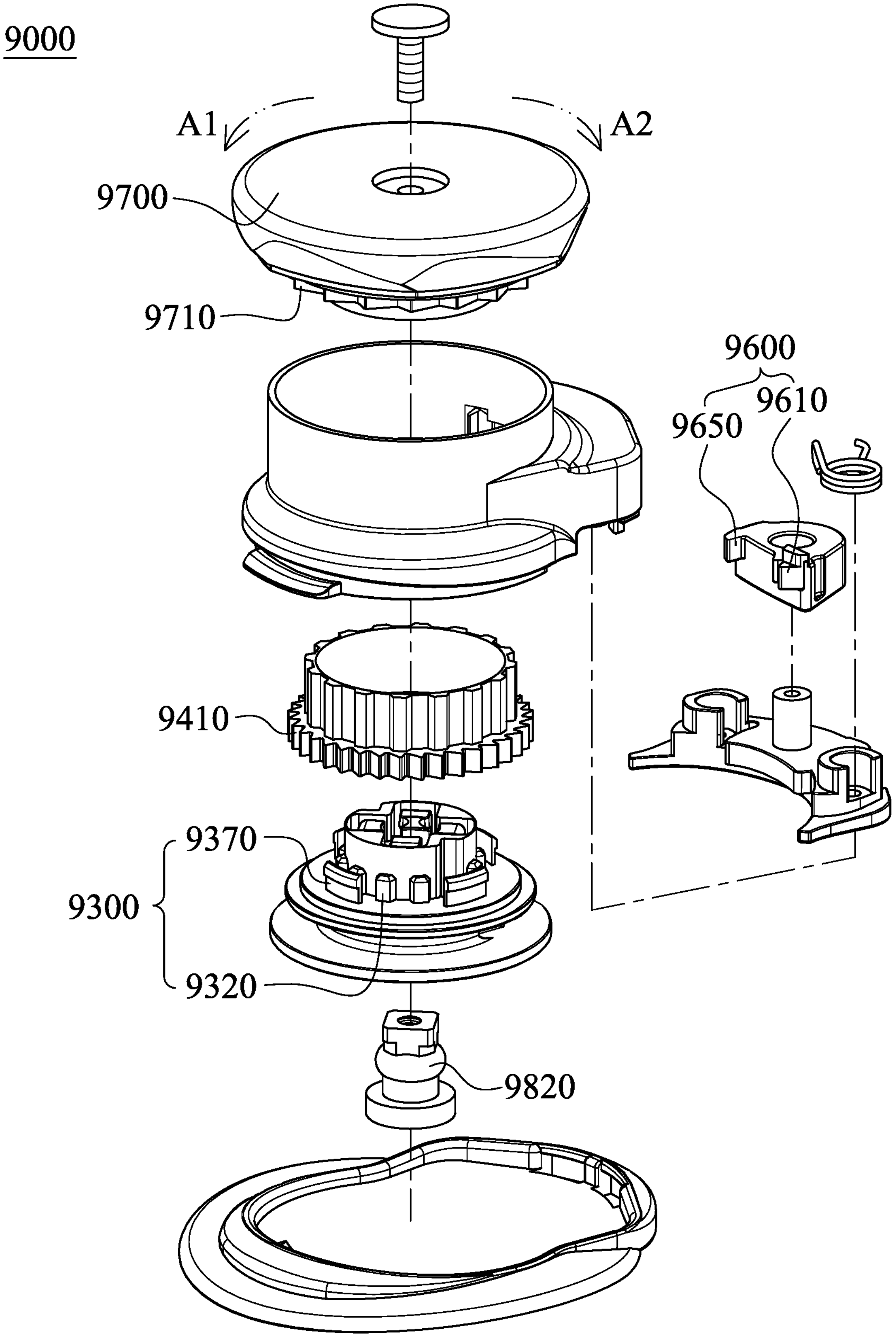
FIG. 46 is one exploded view showing a fastening device according a ninth embodiment of the present disclosure.
Figure 47:
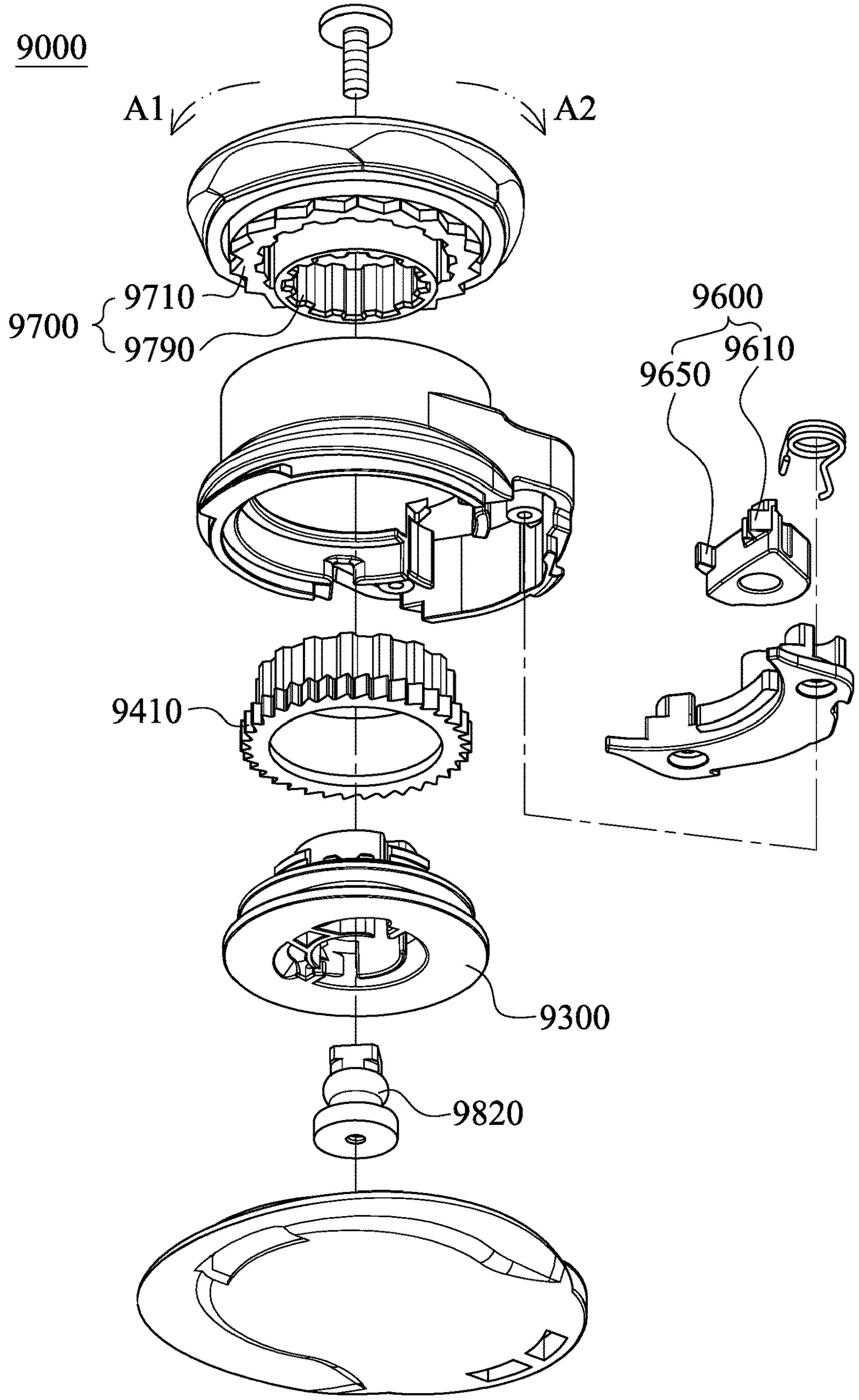
FIG. 47 is another exploded view showing the fastening device of the ninth embodiment of FIG. 46.

FIG. 46 is one exploded view showing a fastening device 9000 according a ninth embodiment of the present disclosure. FIG. 47 is another exploded view showing the fastening device 9000 of the ninth embodiment of FIG. 46. The fastening device 8000 of the ninth embodiment is similar to the fastening device 3000 of the third embodiment, and includes a case, a spool 9300, a knob 9700, a ratchet element 9600 and a positioning shaft 9820. The ratchet element 9600 includes a ratchet arm 9610 and a stopping tooth 9650, and the lace can be full released via pulling the knob 9700 upward. The details of the similar structure will not be repeated, and the difference is specified hereinafter.

The spool 9300 may include a plurality of mounting portions 9370, the wheel 9400 may further include a stepping portion 9450 located inside the wheel body, and the mounting portions 9370 and the stepping portion 9450 are coordinated to restrict the wheel 9400. In addition, the positioning shaft 9820 passes through the wheel 9400 to abut against the knob 9700 while not contact with the wheel 9400. Hence, as the knob 9700 is pulled upward, the wheel 9400 and the ratchet teeth 9410 will not be lifted upward.

The knob 9700 may further include a plurality of driving teeth 9790 corresponding to the second combining teeth 9320 of the spool 9300.

Figure 48:
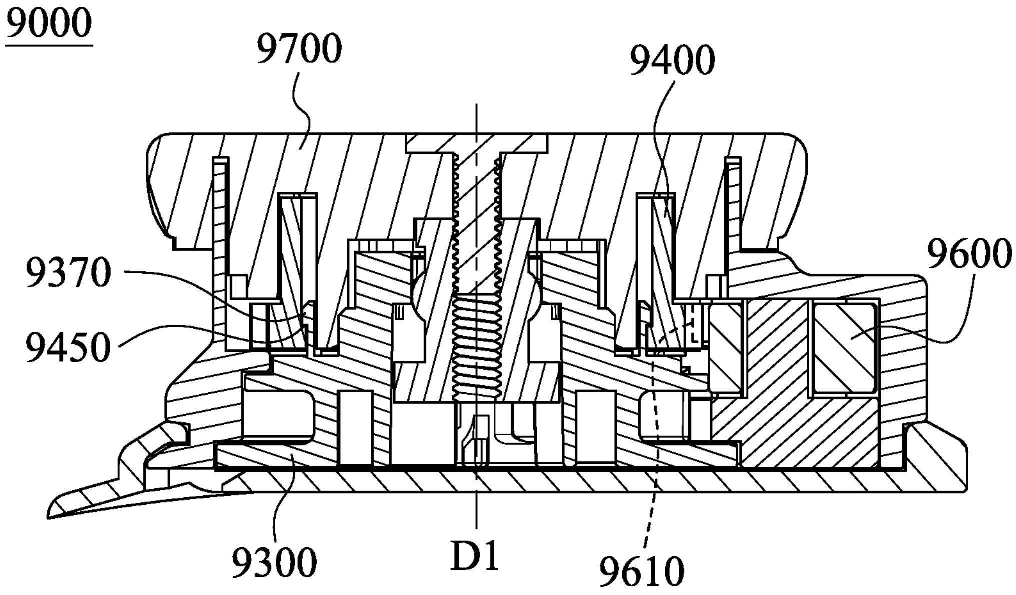
FIG. 48 is one cross-section side view showing the fastening device of the ninth embodiment of FIG. 46.
Figure 49:
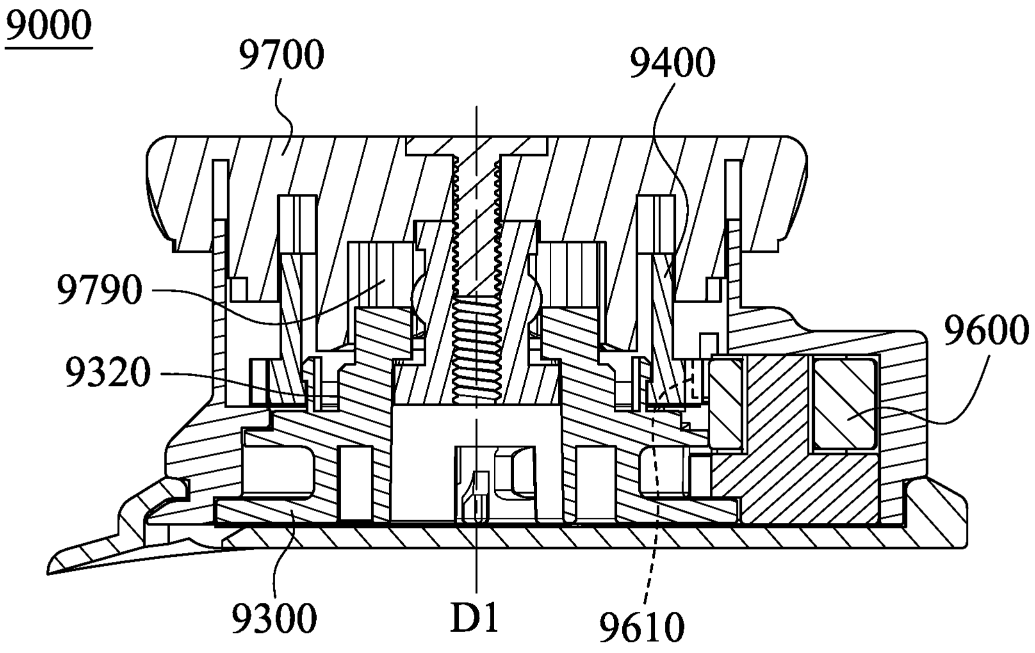
FIG. 49 is another cross-section side view showing the fastening device of the ninth embodiment of FIG. 46.

FIG. 48 is one cross-section side view showing the fastening device 9000 of the ninth embodiment of FIG. 46. FIG. 49 is another cross-section side view showing the fastening device 9000 of the ninth embodiment of FIG. 46. As shown in FIG. 48, as the knob 9700 is not pulled up along the axial direction D1 and is in the first position, the movements of the knob 9700, the ratchet element 9600, the spool 9300, the ratchet teeth 9410 and the positioning shaft 9820 are similar to the movements of the fastening device 3000 of the third embodiment, rotating the knob 9700 in the tensioning direction A2 may tension the lace, and rotating the knob 9700 in the opposite direction may allow the knob teeth 9710 to displace the ratchet arm 9610, thereby achieving a goal of incrementally releasing the lace. The details will not be repeated.

Moreover, as shown in FIG. 49, as the knob 9700 is pulled upward along the axial direction D1 by the user to switch to the second position, the driving teeth 9790 are disengaged from the second combining teeth 9320, and the spool 9300 may be rotated freely to fully release the lace.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A fastening device, comprising:

a case;

a spool disposed in the case and configured for a lace to be wound therearound;

a plurality of ratchet teeth inside the case;

a ratchet element pivotally disposed at the case and located at one side of the ratchet teeth along a radial direction, the ratchet element being free from moving along an axial direction, the ratchet element comprising a ratchet arm selectively engaged with at least one of the ratchet teeth, and a stopping tooth, wherein the ratchet arm and the stopping tooth are not engaged with the ratchet teeth simultaneously; and a knob disposed at the case;

wherein as the ratchet arm is engaged with at least one of the ratchet teeth, the spool is prohibited to rotate in a releasing direction, as the ratchet element swings, the ratchet arm swings outward and separates from at least one of the ratchet teeth, allowing the spool to be rotated in the releasing direction and the stopping tooth then to swing inward to engage with at least another one of the ratchet teeth to stop releasing the lace, and as the knob is rotated in a tensioning direction, the ratchet arm is disengaged from at least one of the ratchet teeth to allow the spool to tension the lace.

2. The fastening device of claim 1, further comprising a swinging arm at least partially exposing from the case, wherein the ratchet element further comprises a linking portion, the swinging arm is abutted against the linking portion, and as the swinging arm is operated, the ratchet arm is disengaged from at least one of the ratchet teeth, thereby allowing the lace to be incrementally released.

3. The fastening device of claim 1, further comprising a plurality of knob teeth connected to the knob, wherein the ratchet element further comprises a sliding portion located above the ratchet arm and corresponding to at least one of the knob teeth, and as the knob is rotated in the releasing direction, at least one of the knob teeth pushes the sliding portion to rotate the ratchet element, and the ratchet element is disengaged from at least one of the ratchet teeth, thereby allowing the lace to be incrementally released.

4. The fastening device of claim 1, wherein the case comprises:

a main-space; and a sub-space communicated with the main-space;

wherein the spool is in the main-space, the ratchet element is located in the sub-space, and the ratchet arm extends into the main-space.

5. The fastening device of claim 4, further comprising:

a wheel disposed within the main-space and selectively coupled to the spool, the ratchet teeth being located at the wheel;

wherein the knob is operated to drive the wheel, and the ratchet teeth are lifted to allow the spool to rotate in the releasing direction for fully releasing the lace.

6. The fastening device of claim 5, wherein the wheel comprises at least one guiding portion, the knob comprises at least one guiding track corresponding to the at least one guiding portion, and as the knob is rotated in the releasing direction to allow the at least one guiding portion to be guided by the guiding track, the wheel is moved along the axial direction, and the spool is rotated in the releasing direction to fully release the lace.

7. The fastening device of claim 4, wherein the knob comprises a protruding ring protruding toward the main-space, the ratchet teeth are located at an outer surface of the protruding ring, and operating the knob causes the ratchet teeth to move upward and allows the spool to rotate in the releasing direction.

8. The fastening device of claim 5, further comprising a connecting set penetrating the spool and coupled to the knob, wherein the spool comprises a positioning portion, the connecting set penetrates and is coupled to the positioning portion, pulling the knob upward causes the ratchet teeth and the connecting set to move along the axial direction, thereby allowing the spool to rotate in the releasing direction for fully releasing the lace, and the connecting set is positioned by the positioning portion.

9. The fastening device of claim 1, wherein the case comprises:

an annular wall surrounding a main-space;

a partition protruding inward from the annular wall; and an upper opening communicated with the main-space;

wherein the spool comprises an upper ring portion, and the partition axially restricts the upper ring portion to prohibit the spool from leaving the main-space from the upper opening.

10. The fastening device of claim 1, wherein the case comprises:

an annular wall surrounding a main-space;

an inner ring groove located at the annular wall and communicated with the main-space; and an upper opening communicated with the main-space;

wherein the spool comprises a lower ring portion, and the lower ring portion is received in the inner ring groove to prohibit the spool from leaving the main-space from the upper opening.

11. The fastening device of claim 1, wherein the case comprises:

an annular wall surrounding a main-space; and at least one inclined guiding block located at an outer surface of the annular wall;

wherein the knob comprises a plurality of guiding teeth corresponding the at least one inclined guiding block, and as the knob is moved downward along the axial direction, at least one of the guiding teeth is guided by the at least one inclined guiding block.

* * * * *